(12) United States Patent
Fan et al.

(10) Patent No.: US 12,579,831 B2
(45) Date of Patent: Mar. 17, 2026

(54) GENERATING IMAGE DIFFERENCE CAPTIONS VIA AN IMAGE-TEXT CROSS-MODAL NEURAL NETWORK

(71) Applicants: Adobe Inc., San Jose, CA (US); University of Surrey, Guildford (GB)

(72) Inventors: Yifei Fan, Santa Clara, CA (US); John Collomosse, Woking (GB); Jing Shi, Rochester, NY (US); Alexander Black, London (GB)

(73) Assignees: Adobe Inc., San Jose, CA (US); University of Surrey, Guildford (GB)

( * ) Notice: Subject to any disclaimer, the term of this patent is extended or adjusted under 35 U.S.C. 154(b) by 271 days.

(21) Appl. No.: 18/489,681

(22) Filed: Oct. 18, 2023

(65) Prior Publication Data

US 2025/0131753 A1     Apr. 24, 2025

(51) Int. Cl.
| | |
|---|---|
| *G06V 20/70* | (2022.01) |
| *G06V 10/44* | (2022.01) |
| *G06V 10/771* | (2022.01) |
| *G06V 10/82* | (2022.01) |

(52) U.S. Cl.
CPC .............. *G06V 20/70* (2022.01); *G06V 10/44* (2022.01); *G06V 10/771* (2022.01); *G06V 10/82* (2022.01)

(58) Field of Classification Search
CPC ...... G06V 20/70; G06V 10/771; G06V 10/82; G06V 10/44
See application file for complete search history.

(56) References Cited

U.S. PATENT DOCUMENTS

2025/0125039 A1* 4/2025 Steen ..................... G16H 30/40

OTHER PUBLICATIONS

Xiaonan Lu et al, "Viewpoint Integration and Registration with Vision Language Foundation Model for Image Change Understanding ", Sep. 15, 2023, arXiv:2309.08585v1 (12 Pages) (Year: 2023).*
Li et al, "BLIP-2: Bootstrapping Language-Image Pre-training with Frozen Image Encoders and Large Language Models", Jul. 23-29, 2023, Proceedings of the 40 th International Conference on Machine Learning (13 Pages) (Year: 2023).*

(Continued)

*Primary Examiner* — David F Dunphy
(74) *Attorney, Agent, or Firm* — Keller Preece PLLC

(57) ABSTRACT

Methods, systems, and non-transitory computer readable storage media are disclosed for generating difference captions indicating detected differences in digital image pairs. The disclosed system generates a first feature map of a first digital image and a second feature map of a second digital image. The disclosed system converts, utilizing a linear projection neural network, the first feature map to a first modified feature map in a feature space corresponding to a large language machine-learning model. The disclosed system also converts, utilizing the linear projection neural network layer, the second feature map to a second modified feature map in the feature space corresponding to the large language machine-learning model. The disclosed system further generates, utilizing the large language machine-learning model, a difference caption indicating a difference between the first digital image and the second digital image from a combination of the first modified feature map and the second modified feature map.

20 Claims, 12 Drawing Sheets

(56) References Cited

OTHER PUBLICATIONS

Wikipedia, "Large Language Model" [online], 2025[retrieved on Sep. 10, 2025]. Retrieved from the Internet: <URL: https://en.wikipedia.org/wiki/Large_language_model > (35 pages) (Year: 2025).*

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In Proc. ICML, pp. 8748-8763. PMLR, 2021.

Alex Graves and Alex Graves. Long short-term memory. Supervised sequence labelling with recurrent neural networks, pp. 37-45, 2012.

Alexander Black, Tu Bui, Hailin Jin, Vishy Swaminathan, and John Collomosse. Deep image comparator: Learning to visualize editorial change. In Proc. CVPR WS, pp. 972-980. IEEE, 2021.

Alexander Black, Tu Bui, Simon Jenni, Viswanathan Swaminathan, and John Collomosse. Vpn: Video provenance network for robust content attribution. In Proc. CVMP, pp. 1-10, 2021.

Amir Hertz, Ron Mokady, Jay Tenenbaum, Kfir Aberman, Yael Pritch, and Daniel Cohen-Or. Prompt-to-prompt image editing with cross attention control. arXiv preprint arXiv:2208.01626, 2022.

Andrej Karpathy and Li Fei-Fei. Deep visual-semantic alignments for generating image descriptions. In Proc. CVPR, pp. 3128-3137, 2015.

Basil Mustafa, Carlos Riquelme Ruiz, Joan Puigcerver, Rodolphe Jenatton, and Neil Houlsby. Multimodal contrastive learning with limoe: the language-image mixture of experts. In NeurIPS, 2022.

Ben Wang and Aran Komatsuzaki. Gpt-j-6b: A 6 billion parameter autoregressive language model. https://github.com/kingoflolz/mesh-transformer-jax, May 2021.

Chin-Yew Lin. Rouge: A package for automatic evaluation of summaries. In Text summarization branches out, pp. 74-81, 2004.

Christoph Schuhmann, Romain Beaumont, Richard Vencu, Cade Gordon, Ross Wightman, Mehdi Cherti, Theo Coombes, Aarush Katta, Clayton Mullis, Mitchell Wortsman, Patrick Schramowski, Srivatsa Kundurthy, Katherine Crowson, Ludwig Schmidt, Robert Kaczmarczyk, and Jenia Jitsev. Laion-5b: An open large-scale dataset for training next generation image-text models. In NeurIPS, vol. 35, pp. 25278-25294, 2022.

Coalition for Content Provenance and Authenticity. Technical specification 1.3. Technical report, C2PA, 2023.

Constantin Eichenberg, Sidney Black, Samuel Weinbach, Letitia Parcalabescu, and Anette Frank. Magma—multimodal augmentation of generative models through adapter-based finetuning. arXiv preprint arXiv:2112.05253, 2021.

Danny Driess, Fei Xia, Mehdi S. M. Sajjadi, Corey Lynch, Aakanksha Chowdhery, Brian Ichter, Ayzaan Wahid, Jonathan Tompson, Quan Vuong, Tianhe Yu, Wenlong Huang, Yevgen Chebotar, Pierre Sermanet, Daniel Duckworth, Sergey Levine, Vincent Vanhoucke, Karol Hausman, Marc Toussaint, Klaus Greff, Andy Zeng, Igor Mordatch, and Pete Florence. Palm-e: An embodied multimodal language model. In arXiv preprint arXiv:2303.03378, 2023.

Dong Huk Park, Trevor Darrell, and Anna Rohrbach. Robust change captioning. In Proc. ICCV, pp. 4624-4633, 2019.

Ed Pizzi, Sreya Dutta Roy, Sugosh Nagavara Ravindra, Priya Goyal, and Matthijs Douze. A self-supervised descriptor for image copy detection. In Proc. CVPR, pp. 14532-14542, 2022.

Eric Nguyen, Tu Bui, Viswanathan Swaminathan, and John Collomosse. Oscar-net: Object-centric scene graph attention for image attribution. In Proc. ICCV, pp. 14499-14508, 2021.

Harsh Jhamtani and Taylor Berg-Kirkpatrick. Learning to describe differences between pairs of similar images. In Proc. Conf. Empirical Methods NLP, pp. 4024-4034, 2018.

Hoeseong Kim, Jongseok Kim, Hyungseok Lee, Hyunsung Park, and Gunhee Kim. Agnostic change captioning with cycle consistency. In Proc. ICCV, pp. 2095-2104, 2021.

Hongwei Ge, Zehang Yan, Kai Zhang, Mingde Zhao, and Liang Sun. Exploring overall contextual information for image captioning in human-like cognitive style. In Proc. ICCV, pp. 1754-1763, 2019.

Hugo Touvron, Thibaut Lavril, Gautier Izacard, Xavier Martinet, Marie-Anne Lachaux, Timothée Lacroix, Baptiste Roziére, Naman Goyal, Eric Hambro, Faisal Azhar, et al. Llama: Open and efficient foundation language models. arXiv preprint arXiv:2302.13971, 2023.

Jack Merullo, Louis Castricato, Carsten Eickhoff, and Ellie Pavlick. Linearly mapping from image to text space. arXiv preprint arXiv:2209.15162, 2022.

Jacob Devlin, Ming-Wei Chang, Kenton Lee, and Kristina Toutanova. Bert: Pre-training of deep bidirectional transformers for language understanding. arXiv preprint arXiv:1810.04805, 2018.

Jean-Baptiste Alayrac, Jeff Donahue, Pauline Luc, Antoine Miech, Iain Barr, Yana Hasson, Karel Lenc, Arthur Mensch, Katherine Millican, Malcolm Reynolds, et al. Flamingo: a visual language model for few-shot learning. NeurIPS, 35:23716-23736, 2022.

Jeffrey Donahue, Lisa Anne Hendricks, Sergio Guadarrama, Marcus Rohrbach, Subhashini Venugopalan, Kate Saenko, and Trevor Darrell. Long-term recurrent convolutional networks for visual recognition and description. In Proc. CVPR, pp. 2625-2634, 2015.

Jiasen Lu, Caiming Xiong, Devi Parikh, and Richard Socher. Knowing when to look: Adaptive attention via a visual sentinel for image captioning. In Proc. CVPR, pp. 375-383, 2017.

Jiuxiang Gu, Jianfei Cai, Gang Wang, and Tsuhan Chen. Stack-captioning: Coarse-to-fine learning for image captioning. In Proc. AAAI, vol. 32, 2018.

Junhua Mao, Wei Xu, Yi Yang, Jiang Wang, Zhiheng Huang, and Alan Yuille. Deep captioning with multimodal recurrent neural networks (m-rnn). In Proc. ICLR, 2015.

Junnan Li, Dongxu Li, Silvio Savarese, and Steven Hoi. Blip-2: Bootstrapping language-image pre-training with frozen image encoders and large language models. arXiv preprint arXiv:2301.12597, 2023.

Justin Johnson, Bharath Hariharan, Laurens Van Der Maaten, Li Fei-Fei, C Lawrence Zitnick, and Ross Girshick. Clevr: A diagnostic dataset for compositional language and elementary visual reasoning. In Proc. CVPR, pp. 2901-2910, 2017.

Kaitao Song, Xu Tan, Tao Qin, Jianfeng Lu, and Tie-Yan Liu. Mpnet: Masked and permuted pre-training for language understanding. NeurIPS, 33:16857-16867, 2020.

Kishore Papineni, Salim Roukos, Todd Ward, and Wei-Jing Zhu. Bleu: a method for automatic evaluation of machine translation. In Proc. Assoc. Comp. Linguistics, pp. 311-318, 2002.

Linli Yao, Weiying Wang, and Qin Jin. Image difference captioning with pre-training and contrastive learning. In Proc. AAAI, vol. 36, pp. 3108-3116, 2022.

Lun Huang, Wenmin Wang, Yaxian Xia, and Jie Chen. Adaptively aligned image captioning via adaptive attention time. NeurIPS, 32, 2019.

Marcella Cornia, Matteo Stefanini, Lorenzo Baraldi, and Rita Cucchiara. Meshed-memory transformer for image captioning. In Proc. CVPR, pp. 10578-10587, 2020.

Maria Tsimpoukelli, Jacob L Menick, Serkan Cabi, SM Eslami, Oriol Vinyals, and Felix Hill. Multimodal few-shot learning with frozen language models. NeurIPS, 34:200-212, 2021.

Matteo Stefanini, Marcella Cornia, Lorenzo Baraldi, Silvia Cascianelli, Giuseppe Fiameni, and Rita Cucchiara. From show to tell: A survey on deep learning-based image captioning. IEEE TPAMI, 45(1):539-559, 2022.

Oriol Vinyals, Alexander Toshev, Samy Bengio, and Dumitru Erhan. Show and tell: A neural image caption generator. In Proc. CVPR, pp. 3156-3164, 2015.

Peng Gao, Jiaming Han, Renrui Zhang, Ziyi Lin, Shijie Geng, Aojun Zhou, Wei Zhang, Pan Lu, Conghui He, Xiangyu Yue, et al. Llama-adapter v2: Parameter-efficient visual instruction model. arXiv preprint arXiv:2304.15010, 2023.

Pengchuan Zhang, Xiujun Li, Xiaowei Hu, Jianwei Yang, Lei Zhang, Lijuan Wang, Yejin Choi, and Jianfeng Gao. Vinvl: Revisiting visual representations in vision-language models. In Proc. CVPR, pp. 5579-5588, 2021.

Peter Anderson, Xiaodong He, Chris Buehler, Damien Teney, Mark Johnson, Stephen Gould, and Lei Zhang. Bottom-up and top-down attention for image captioning and visual question answering. In Proc. CVPR, pp. 6077-6086, 2018.

(56) References Cited

OTHER PUBLICATIONS

Ramakrishna Vedantam, C Lawrence Zitnick, and Devi Parikh. Cider: Consensus-based image description evaluation. In Proc. CVPR, pp. 4566-4575, 2015.

Robin Rombach, Andreas Blattmann, Dominik Lorenz, Patrick Esser, and Björn Ommer. High-resolution image synthesis with latent diffusion models. In Proc. CVPR, pp. 10684-10695, 2022.

Ron Mokady, Amir Hertz, and Amit H Bermano. Clipcap: Clip prefix for image captioning. arXiv preprint arXiv:2111.09734, 2021.

S. Gregory. Ticks or it didn't happen. Technical report, Witness.org, 2019.

S. Heller, L. Rossetto, and H. Schuldt. The PS-Battles Dataset—an Image Collection for Image Manipulation Detection. CoRR, abs/1804.04866, 2018.

Satanjeev Banerjee and Alon Lavie. Meteor: An automatic metric for mt evaluation with improved correlation with human judgments. In Proc. ACL WS Intr. Extr. Eval. Measures Machine Trans. Summarization, pp. 65-72, 2005.

Steven J Rennie, Etienne Marcheret, Youssef Mroueh, Jerret Ross, and Vaibhava Goel. Self-critical sequence training for image captioning. In Proc. CVPR, pp. 7008-7024, 2017.

Tim Brooks, Aleksander Holynski, and Alexei A Efros. Instructpix2pix: Learning to follow image editing instructions. arXiv preprint arXiv:2211.09800, 2022.

Ting Yao, Yingwei Pan, Yehao Li, and Tao Mei. Hierarchy parsing for image captioning. In Proc. ICCV, pp. 2621-2629, 2019.

Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al. Language models are few-shot learners. NeurIPS, 33:1877-1901, 2020.

Xiangxi Shi, Xu Yang, Jiuxiang Gu, Shafiq Joty, and Jianfei Cai. Finding it at another side: A viewpoint adapted matching encoder for change captioning. In Proc. ECCV, pp. 574-590. Springer, 2020.

Xiaowei Hu, Zhe Gan, Jianfeng Wang, Zhengyuan Yang, Zicheng Liu, Yumao Lu, and Lijuan Wang. Scaling up vision-language pre-training for image captioning. In Proc. CVPR, pp. 17980-17989, 2022.

Xiujun Li, Xi Yin, Chunyuan Li, Pengchuan Zhang, Xiaowei Hu, Lei Zhang, Lijuan Wang, Houdong Hu, Li Dong, Furu Wei, et al. Oscar: Object-semantics aligned pre-training for vision-language tasks. In Proc. ECCV, pp. 121-137. Springer, 2020.

Xu Yang, Kaihua Tang, Hanwang Zhang, and Jianfei Cai. Auto-encoding scene graphs for image captioning. In Proc. CVPR, p. 10685-10694, 2019.

Yaoqi Sun, Liang Li, Tingting Yao, Tongyv Lu, Bolun Zheng, Chenggang Yan, Hua Zhang, Yongjun Bao, Guiguang Ding, and Gregory Slabaugh. Bidirectional difference locating and semantic consistency reasoning for change captioning. IJIS, 37(5):2969-2987, 2022.

Yunpeng Luo, Jiayi Ji, Xiaoshuai Sun, Liujuan Cao, Yongjian Wu, Feiyue Huang, Chia-Wen Lin, and Rongrong Ji. Dual-level collaborative transformer for image captioning. In Proc. AAAI, vol. 35, pp. 2286-2293, 2021.

Zirui Wang, Jiahui Yu, Adams Wei Yu, Zihang Dai, Yulia Tsvetkov, and Yuan Cao. Simvlm: Simple visual language model pretraining with weak supervision. In Proc. ICLR, 2021.

Zixin Guo, Tzu-Jui Wang, and Jorma Laaksonen. Clip4idc: Clip for image difference captioning. In Proc. Conf. Asia-Pacific Chapter Assoc. Comp. Linguistics and Int. Joint Conf. NLP, pp. 33-42, 2022.

* cited by examiner

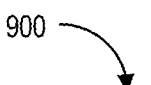

900

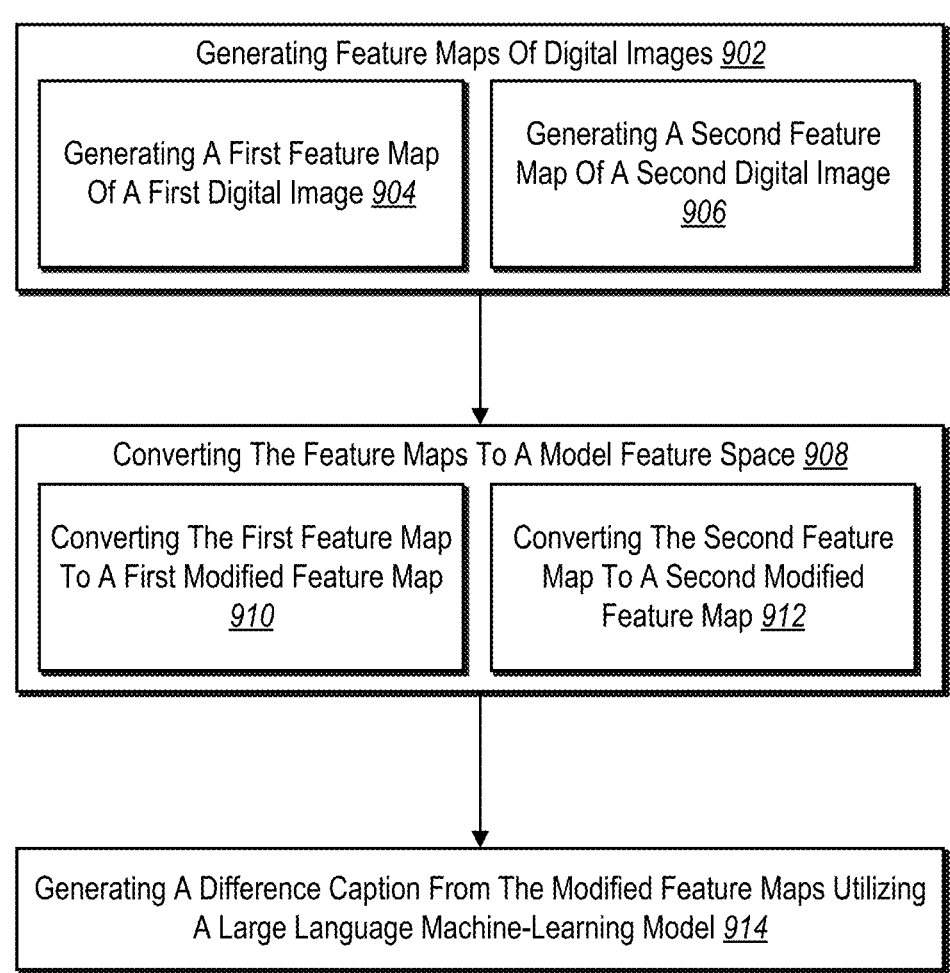

Generating Feature Maps Of Digital Images 902

Generating A First Feature Map Of A First Digital Image 904

Generating A Second Feature Map Of A Second Digital Image 906

Converting The Feature Maps To A Model Feature Space 908

Converting The First Feature Map To A First Modified Feature Map 910

Converting The Second Feature Map To A Second Modified Feature Map 912

Generating A Difference Caption From The Modified Feature Maps Utilizing A Large Language Machine-Learning Model 914

*Fig. 9*

GENERATING IMAGE DIFFERENCE CAPTIONS VIA AN IMAGE-TEXT CROSS-MODAL NEURAL NETWORK

BACKGROUND

Improvements to machine-learning and neural network based computer processing technologies have led to significant advancements in the field of image processing. In particular, many industries have implemented machine-learning and neural network based digital image generation and manipulation operations for a variety of uses. Additionally, computer-assisted image editing tools have increased the accessibility of digital image editing applications for a larger audience of users with different levels of expertise. As a result, the number and quality of synthetically generated or manipulated digital images has increased significantly. Due to the proliferation and improved quality of synthetically generated/modified digital images in many different contexts, many users (and even computer software) find it difficult to determine whether and how digital images have been modified. Furthermore, conventional systems have a number of shortcomings with regard to accurately identifying and explaining (e.g., in a human-readable format) differences between digital images.

SUMMARY

One or more embodiments provide benefits and/or solve one or more of the foregoing or other problems in the art with systems, methods, and non-transitory computer readable storage media for generating difference captions indicating detected differences in digital image pairs. For example, in one or more embodiments, the disclosed systems generate separate feature maps for digital images in an image pair. The disclosed systems utilize a trainable linear projection layer convert the feature maps of the digital images to modified feature maps in a feature space corresponding to a large language machine-learning model. Additionally, the disclosed systems combine the modified feature maps (e.g., via concatenation or a difference of the modified feature maps) and generate a difference caption from the combined modified feature maps utilizing the large language machine-learning model. In one or more additional embodiments, the disclosed systems learn parameters of the projection layer by comparing the generated difference caption to a target caption generated based on an augmented image dataset including annotations of digital images in image pairs. The disclosed systems thus provide a cross-modal neural network that efficiently generates accurate image difference captions.

BRIEF DESCRIPTION OF THE DRAWINGS

Various embodiments will be described and explained with additional specificity and detail through the use of the accompanying drawings.

FIG. 9 illustrates a flowchart of a series of acts for generating difference captions for image pairs by utilizing an image-text cross-modal neural network in accordance with one or more implementations.

DETAILED DESCRIPTION

Figure 1:
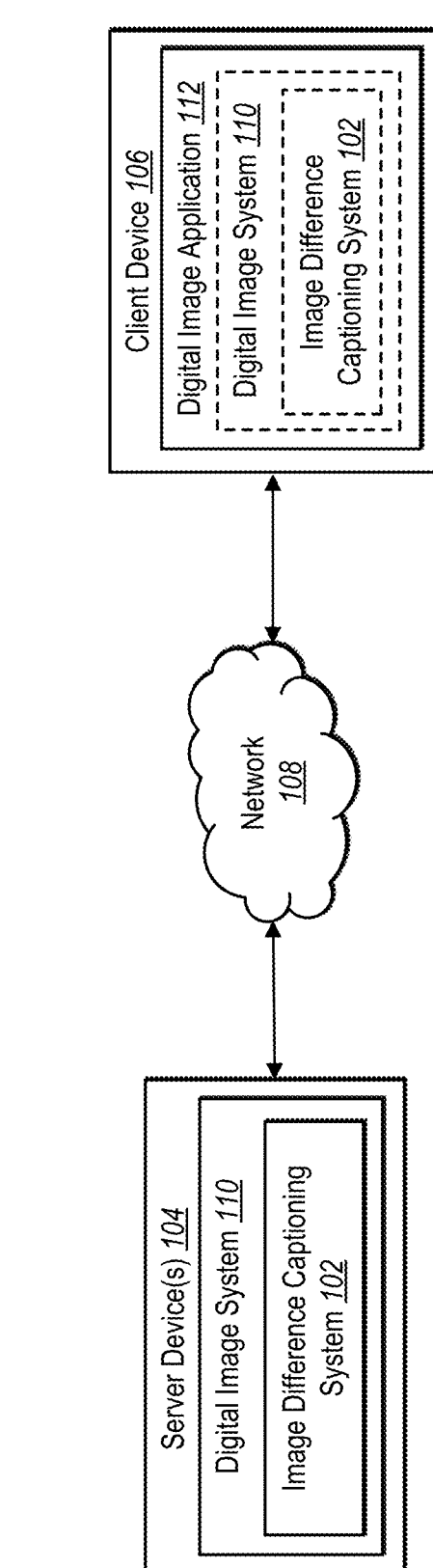
FIG. 1 illustrates an example system environment in which an image difference captioning system operates in accordance with one or more implementations.

One or more embodiments of the present disclosure include an image difference captioning system that utilizes a cross-modal neural network to generate difference captions of digital images in image pairs. For example, the image difference captioning system utilizes a cross-modal neural network to generate separate feature maps of two digital images and convert the separate feature maps into a feature space of a large language machine-learning model in a pairwise manner. Additionally, in some embodiments, the image difference captioning system includes a pre-defined prefix with the difference caption by combining a token embedding of the pre-defined prefix with the separate feature maps to provide to the large language machine-learning model. Furthermore, in one or more embodiments, the image difference captioning system learns parameters of the cross-modal neural network by determining a loss based on generated difference captions and target captions generated via text descriptions of image pairs.

As mentioned, in one or more embodiments, the image difference captioning system generates feature maps for digital images in an image pair (or set of digital images). In some embodiments, the image pair includes an initial digital image (or unmodified initial digital image) and a modified version of the initial digital image. For instance, the image difference captioning system utilizes a neural network encoder to extract features from a first digital image and a second digital image to generate a first feature map and a second feature map, respectively. Accordingly, the image difference captioning system generates separate feature representations for each digital image in a set of digital images.

Additionally, in some embodiments, the image difference captioning system converts the feature maps of the digital images to a feature space of a large language machine-learning model. In particular, the image difference captioning system utilizes a linear projection layer to convert feature maps of digital images from a first feature space (e.g., corresponding to the neural network encoder) to a second feature space (e.g., corresponding to the large language machine-learning model). Furthermore, the image difference captioning system combines the modified feature maps in the feature space of the large language machine-learning model, such as by concatenating the modified feature maps or determining a difference feature map. In some implementations, the image difference captioning system also combines the modified feature maps with a token embedding corresponding to a pre-defined prefix.

In one or more embodiments, the image difference captioning system utilizes a large language machine-learning model to generate a difference caption for the image pair. Specifically, the image difference captioning system utilizes the large language machine-learning model to generate a predicted difference caption indicating a difference between the first digital image and the second digital image in the image pair. For example, the image difference captioning system utilizes the large language machine-learning model to generate the predicted difference caption based on a combination of the modified feature maps. Additionally, in some embodiments, the image difference captioning system generates the predicted difference caption based on the modified feature maps with a pre-defined prefix.

As mentioned, in at least some embodiments, the image difference captioning system utilizes a predicted difference caption from the cross-modal neural network to train the cross-modal neural network. In particular, the image difference captioning system generates a predicted caption utilizing the cross-modal neural network. The image difference captioning system also generates a target caption based on text annotations of digital images (e.g., via a large language machine-learning model) or selects from a pre-defined set of target captions. The image difference captioning system determines a loss according to the predicted difference caption and the target caption and learns parameters of the cross-modal neural network.

Some conventional systems that provide digital image processing utilize visual content modeling to describe object differences in text by using object-centric methods. Specifically, some conventional systems capture object representations and their relations by gridding images into non-overlapping patches for extracting features or capturing spatial features in a grid fashion. Additional conventional systems utilize regional proposal networks to extract features from candidate objects to provide alignment with semantic objects mentioned in captions. Although object-based approaches can provide difference captions with accurately detected objects, such conventional systems require accurate pre-segmentation of the digital images. Due to the challenges associated with generating such accurate pre-segmentation, especially for digital videos and digital images with poor or low resolution, the conventional systems often inaccurately determine differences between digital images. Such conventional systems are also unable to detect changes to a single object from one digital image to another digital image.

Additionally, some conventional systems provide image difference captioning by modeling potential change clusters using a long short-term memory-based neural network. For example, some of these conventional systems rely on differences between two digital images at the pixel level. Accordingly, such conventional systems are sensitive to noise in the digital images and geometric transformations between two digital images. Furthermore, some of these conventional systems compute image differences at the semantic level. Such conventional systems, however, are often limited to focusing on image modality for use in near-identical views or synthetic scenes with limited numbers/types of objects and change types.

The image difference captioning system provides a number of advantages over conventional systems in connection with generating difference captions for image pairs. For example, the image difference captioning system improves the accuracy of a computing system generating difference captions for digital images in image pairs. In contrast to conventional systems that detect image differences on a pixel level and thus susceptible to image noise, the image difference captioning system provides accurate and flexible image difference captioning for digital images and digital videos of varying image quality (e.g., are robust to noise). In particular, the image difference captioning system leverages both image and text features in a multi-branch, cross-modal neural network to generate accurate difference captions for digital images in image pairs. Furthermore, in some embodiments, the image difference captioning system provides improved accessibility options (e.g., for visually impaired users) by providing automated, accurate descriptions (e.g., in text-to-speech applications) describing differences between images when presenting two or more digitally generated/altered images.

Additionally, the image difference captioning system provides improved flexibility of computing systems that provide digital image processing. In contrast to conventional systems that utilize object-based difference captioning, the image difference captioning system generates text captions conditioned on comparisons of facts derived from an image pair using image features in a cross-modal neural network. Specifically, by utilizing a cross-modal neural network to extract image features for providing to a large language machine-learning model, the image difference captioning system provides succinct, comprehensible difference captions. To illustrate, the image difference captioning system leverages training of components of the cross-modal neural network on image-text pairs to determine features that a large language machine-learning model uses to generate difference captions.

Furthermore, the image difference captioning system provides an efficient pair-wise training framework via a cross-modal neural network and target captions derived from textual descriptions of image changes. In particular, the image difference captioning system augments a training dataset of image pairs by generating text descriptions of image pairs (and in some instances textual descriptions of changes) to generate target captions via a large language machine-learning model. Additionally, the image difference captioning system uses the target captions as a basis for training and evaluating the cross-modal neural network. The image difference captioning system thus provides a trainable cross-modal neural network that generates difference captions closer to ground-truth captions than conventional systems.

Turning now to the figures, FIG. 1 includes an embodiment of a system environment 100 in which a image difference captioning system 102 is implemented. In particular, the system environment 100 includes server device(s) 104 and a client device 106 in communication via a network 108. Moreover, as shown, the server device(s) 104 include a digital image system 110, which includes the image difference captioning system 102. Additionally, the client device 106 includes a digital image application 112, which optionally includes the digital image system 110 and the image difference captioning system 102.

As shown in FIG. 1, the client device 106 or the server device(s) 104 include or host the digital image system 110.

The digital image system 110 includes, or is part of, one or more systems that implement digital image editing operations. For example, the digital image system 110 provides tools for performing various operations on digital images. To illustrate, the digital image system 110 communicates with the client device 106 via the network 108 to provide the tools for display and interaction via the digital image application 112 at the client device 106. Additionally, in some embodiments, the digital image system 110 receives requests to access digital images stored (e.g., at the server device(s) 104 or at another device such as a digital content database) and/or requests to store digital images. In some embodiments, the digital image system 110 receives interaction data for viewing, generating, or editing a digital image or data associated with the digital image, processes the interaction data (e.g., to view, generate, or edit a digital image), and provides the results of the interaction data for display via the digital image application 112 or to a third-party system.

In one or more embodiments, a digital image includes a digital raster image or a digital vector image with image content represented one or more objects. For example, a digital image includes one or more foreground and/or background objects arranged within a scene. Additionally, in some embodiments, a digital image includes a captured image of a real-world scene. Alternatively, a digital image includes a fully or partially synthetically (e.g., computer) generated image of a fully or partially synthetic scene. In some embodiments, a digital image includes a modified version of another digital image (e.g., in response to one or more digital image editing operations).

According to one or more embodiments, the digital image system 110 utilizes the image difference captioning system 102 to generate difference captions for sets of digital images. In particular, the digital image system 110 utilizes the image difference captioning system 102 to determine one or more differences between digital images in an image pair and generate a text description of the one or more differences. For example, as illustrated in more detail below, the image difference captioning system 102 utilizes a multi-branch, cross-modal neural network to generate a difference caption for a first digital image and a second digital image. Furthermore, in some embodiments, the image difference captioning system 102 utilizes difference captions generated by the cross-modal neural network to further train the cross-modal neural network. Additionally, the image difference captioning system 102 provides tools (e.g., via the digital image application 112) for selecting digital images to compare and generate difference captions based on the comparison. In some implementations, the image difference captioning system 102 also provides tools for automatically detecting whether a digital image is a modified version of another digital image, such as by comparing the digital image to a database of existing digital images utilizing the cross-modal neural network.

As illustrated in FIG. 1, the image difference captioning system 102 can be implemented on the client device 106 or on the server device(s) 104. In particular, in some implementations, the image difference captioning system 102 on the server device(s) 104 supports the image difference captioning system 102 on the client device 106. For instance, the server device(s) 104 generates or obtains the image difference captioning system 102 and/or a cross-modal neural network for the client device 106 (e.g., as part of a software application or suite). The server device(s) 104 provides the image difference captioning system 102 and/or the cross-modal neural network to the client device 106 for performing digital image editing or analysis processes at the client device 106. In other words, the client device 106 obtains (e.g., downloads) the image difference captioning system 102 from the server device(s) 104. At this point, the client device 106 is able to utilize the image difference captioning system 102 to generate difference captions for digital image pairs independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the image difference captioning system 102 being implemented by a particular component and/or device within the system environment 100, the image difference captioning system 102 is implemented, in whole or in part, by other computing devices and/or components in the system environment 100. For example, in some embodiments, the server device(s) 104 include or host the digital image system 110 and/or the image difference captioning system 102.

To illustrate, the image difference captioning system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to perform digital image processing operations (e.g., difference captioning) and, in response, the image difference captioning system 102 or the digital image system 110 on the server device(s) 104 performs operations to generate a difference caption for an image pair. The server device(s) 104 provide the output or results of the operations to the client device 106.

In one or more embodiments, the server device(s) 104 include a variety of computing devices, including those described below with reference to FIG. 10. For example, the server device(s) 104 includes one or more servers for storing and processing data associated with image difference captioning. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with digital images. In some embodiments, the client device 106 also performs functions for generating, capturing, or accessing data to provide to the digital image system 110 and the image difference captioning system 102 in connection with image difference captioning. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Figure 2:
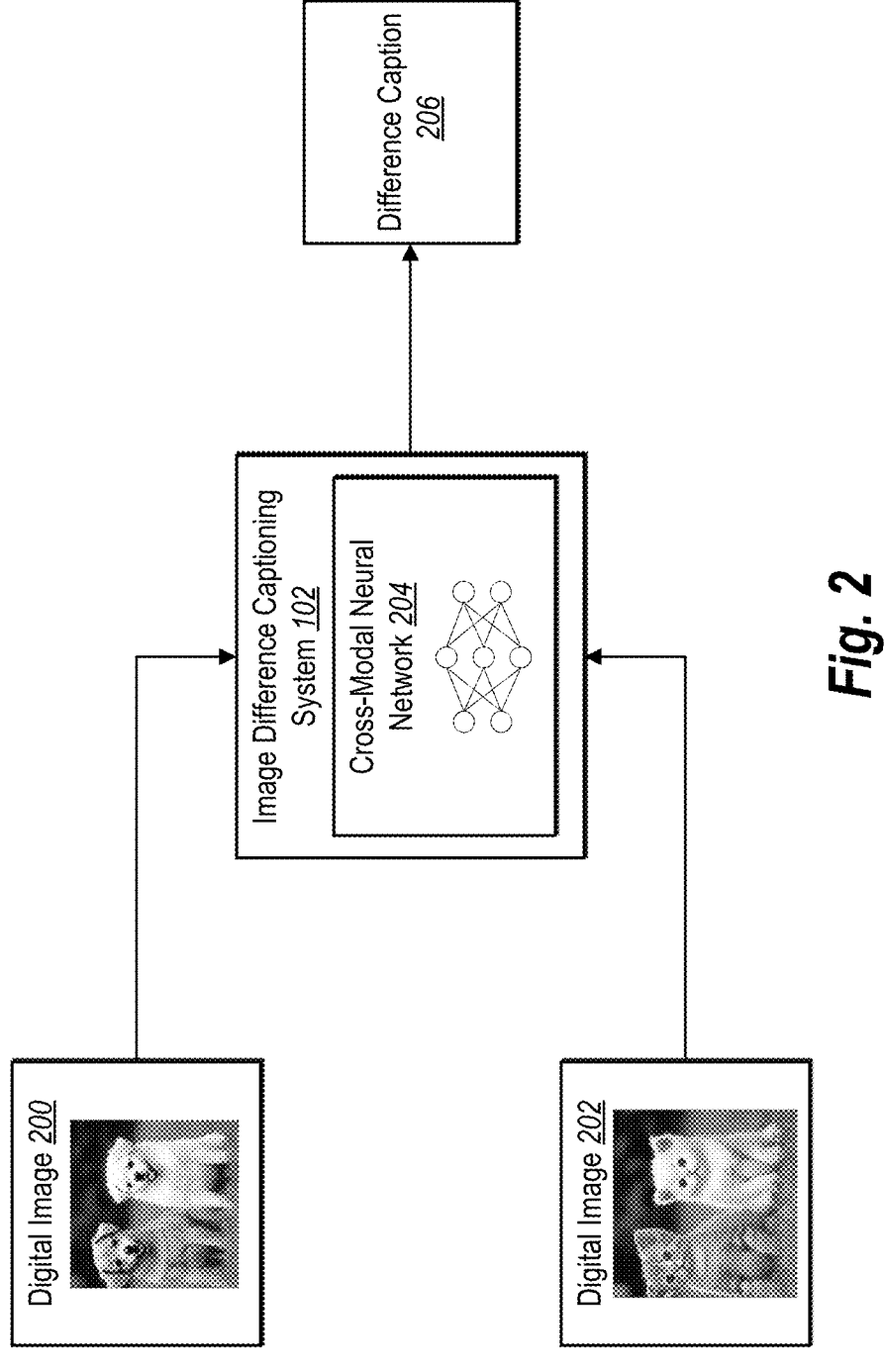
FIG. 2 illustrates a diagram of an overview of the image difference captioning system generating a difference caption for an image pair in accordance with one or more implementations.

As mentioned, the image difference captioning system 102 generates difference captions for digital images in image pairs. Specifically, the image difference captioning system 102 generates a difference caption including a text description (e.g., in natural language) of one or more differences detected between at least two digital images. FIG. 2 illustrates the image difference captioning system 102 utilizing a cross-modal neural network to generate a difference caption describing one or more detected differences between two separate digital images.

As illustrated in FIG. 2, the image difference captioning system 102 determines an image pair including a first digital image 200 and a second digital image 202. In one or more embodiments, the first digital image 200 includes an initial digital image or an unmodified digital image. Additionally, in one or more embodiments, the second digital image 202 includes a modified version of the first digital image 200. In alternative embodiments, the first digital image 200 includes a digital image with first modifications to an initial digital image, and the second digital image 202 includes second modifications to the first digital image. In some embodiments, the first digital image 200 and the second digital image 202 include different copies of the same digital image (e.g., with no visual differences).

Figure 3:
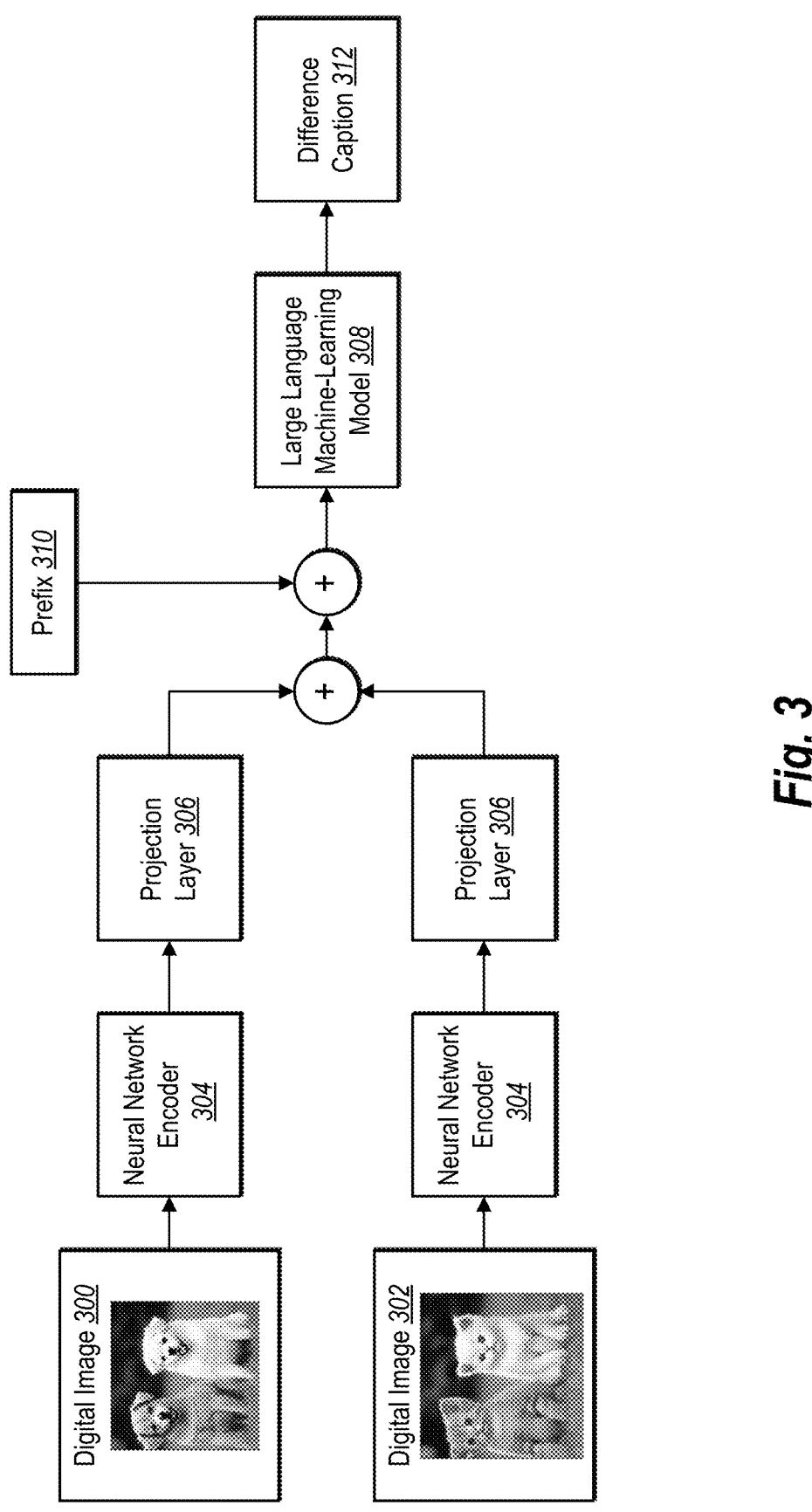
FIG. 3 illustrates a diagram of the image difference captioning system utilizing a cross-modal neural network to generate a difference caption in accordance with one or more implementations.
Figure 4:
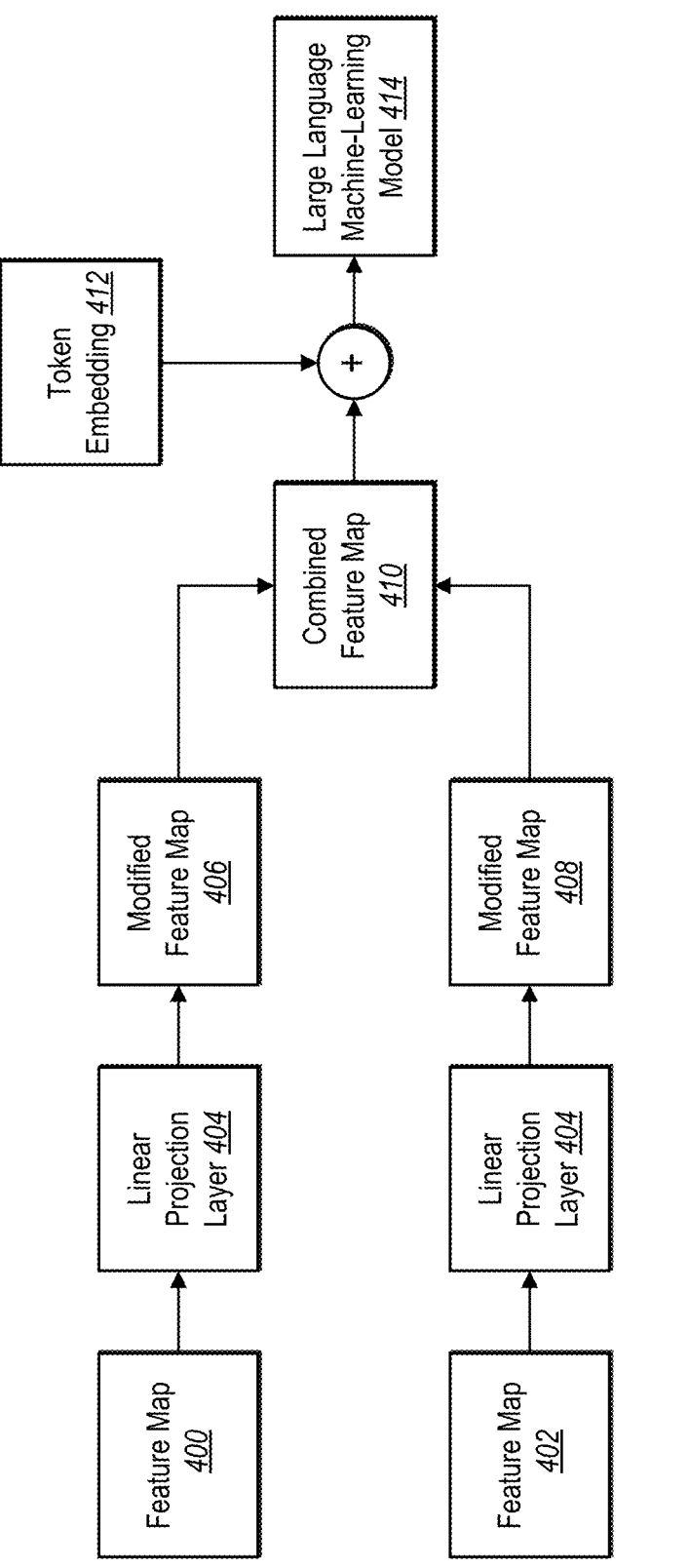
FIG. 4 illustrates a diagram of the image difference captioning system generating and combining feature maps of digital images with a token embedding in accordance with one or more implementations.

In one or more embodiments, as illustrated in FIG. 2, the image difference captioning system 102 includes a cross-modal neural network 204. For example, the cross-modal neural network 204 includes a neural network that utilizes extracted visual features from the first digital image 200 and the second digital image 202 to determine textual features representing the digital images in a pairwise manner. Additionally, the cross-modal neural network 204 includes a large language machine-learning model that further utilizes the textual features representing the digital images to generate a difference caption 206 indicating one or more differences (if any) detected between the first digital image 200 and the second digital image 202. In particular, the difference caption 206 includes a text description of any differences (or of the lack of differences) between the first digital image 200 and the second digital image 202. FIGS. 3-4 and the corresponding description provide additional detail related to generating a difference caption for an image pair.

In at least some embodiments, the cross-modal neural network 204 includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a convolutional neural network, a recurrent neural network, a transformer-based neural network, or a feedforward neural network. In one or more embodiments, a neural network includes, but is not limited to, a plurality of separate neural network branches such as a neural network encoder to encode image features, a projection layer to change a dimensionality of a feature map, and/or a large language machine-learning model to convert encoded features to a digital text output.

Figure 5:
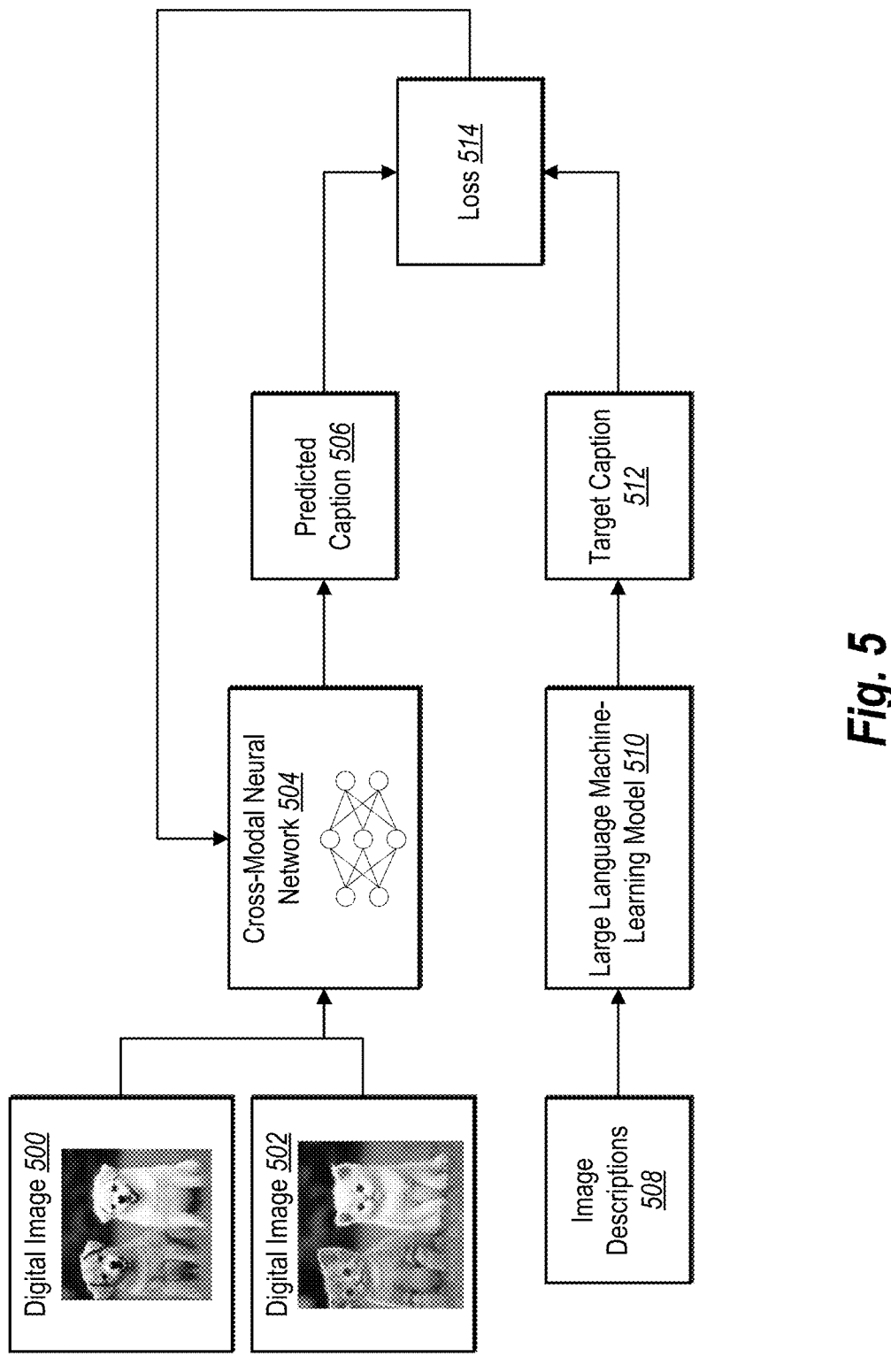
FIG. 5 illustrates a diagram of the image difference captioning system learning parameters of a cross-modal neural network in accordance with one or more implementations.
Figure 6:
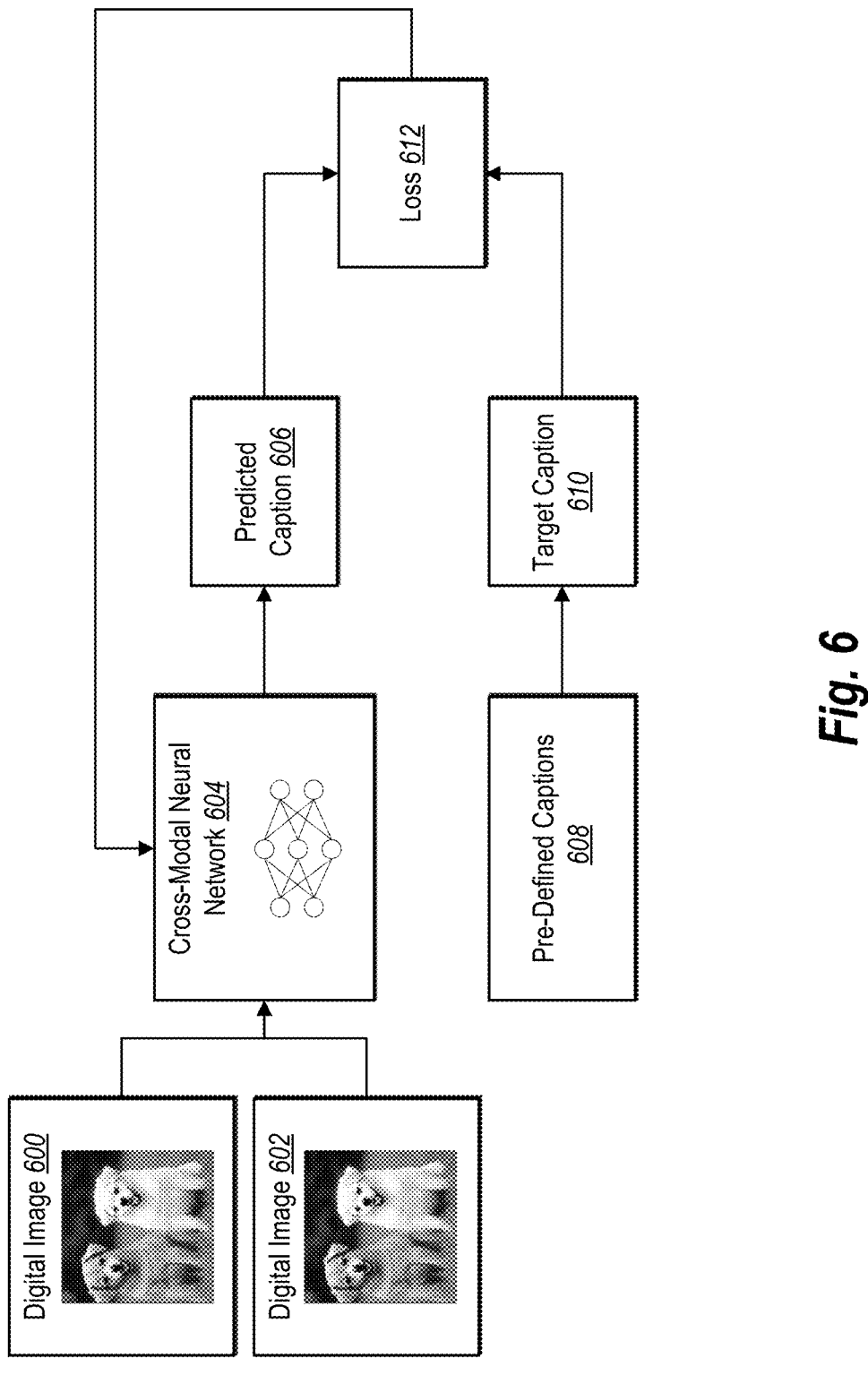
FIG. 6 illustrates a diagram of the image difference captioning system learning parameters of a cross-modal neural network in accordance with one or more implementations.

Furthermore, in some embodiments, the image difference captioning system 102 trains the cross-modal neural network 204 based on the difference caption 206. Specifically, the image difference captioning system 102 compares the difference caption 206 to a target caption to generate a loss. The image difference captioning system 102 utilizes the loss to update parameters of the cross-modal neural network 204. FIGS. 5-6 and the corresponding description provide additional detail related to training a cross-modal neural network.

In one or more embodiments, as mentioned, the image difference captioning system 102 utilizes a cross-modal neural network including a plurality of different layers and/or neural networks to generate a difference caption for a plurality of digital images. FIG. 3 illustrates the image difference captioning system 102 utilizing a cross-modal neural network including a neural network encoder, a projection layer, and a large language machine-learning model to generate a difference caption for an image pair. Additionally, in some embodiments, the image difference captioning system 102 incorporates a pre-defined prefix with the difference caption.

As illustrated in FIG. 3, the image difference captioning system 102 identifies a first digital image 300 and a second digital image 302. For example, as previously mentioned, the second digital image 302 includes a modified version of the first digital image 300. In some embodiments, a modification to the second digital image 302 includes a synthetic modification performed via one or more image editing applications or computing systems. In various examples, the modification includes an added object, a removed object, a modification to an object or region (a modified object texture, a warped region), and/or a global modification to the first digital image 300 (e.g., a modified color, a modified lighting). In alternative embodiments, as mentioned, the image difference captioning system 102 determines an image pair including identical digital images.

In one or more embodiments, the image difference captioning system 102 identifies the first digital image 300 and the second digital image 302 in response to a request to determine whether a digital image (e.g., the second digital image 302) has been altered (e.g., an image authenticity request). The image difference captioning system 102 accesses a digital content database including a plurality of digital images and selects one or more digital images (e.g., the first digital image) for comparing to the second digital image 302. In one or more embodiments, the image difference captioning system 102 compares metadata of the second digital image 302 to metadata of the digital images in the digital content database. To illustrate, the image difference captioning system 102 generates a digital finger-print for the second digital image 302 and compares the digital fingerprint to a plurality of digital fingerprints stored for the digital images in the digital content database. Accordingly, the image difference captioning system 102 determines that the first digital image 300 is the same as or similar to the second digital image 302 and provides the digital images to the cross-modal neural network.

In at least some embodiments, the image difference captioning system 102 detects differences between two digital images in an image pair. In additional embodiments, the image difference captioning system 102 detects differences between more than two digital images in a set of digital images. For example, the image difference captioning system 102 compares a sequence of digital images including a plurality of different modifications to determine differences. To illustrate, the image difference captioning system 102 compares a first digital image to a second digital image and a third digital image, in which the second digital image includes a first modification and the third digital image includes a second modification (e.g., in addition to the first modification).

In at least some embodiments, the image difference captioning system 102 determines one or more image pairs from the set of digital image for providing to the cross-modal neural network. The image difference captioning system 102 determines differences between digital images in each image pair. Alternatively, the image difference captioning system 102 provides each of the digital images in the set of digital images to the cross-modal neural network. Accordingly, the image difference captioning system 102 generates one or more difference captions according to the image pairs and/or the set of digital images.

In one or more embodiments, the image difference captioning system 102 utilizes the cross-modal neural network to determine whether a difference exists between the first digital image 300 and the second digital image 302. As illustrated in FIG. 3, the cross-modal neural network includes a neural network encoder 304 to extract features from the digital images in a pairwise manner (e.g., separately for each digital image). For instance, the neural network encoder 304 includes one or more layers to extract visual features from the first digital image 300 and visual features from the second digital image 302. In particular, the image difference captioning system 102 utilizes the neural network encoder 304 to generate separate feature maps (e.g., feature vectors or feature matrices) for the digital images.

In one or more embodiments, the neural network encoder 304 includes a transformer-based neural network or a contrastive learning neural network. For example, the neural network encoder 304 includes layers trained to extract visual concepts in digital images with natural language supervision with contrastive learning, such as for visually classifying the contents of digital images according to a set of natural language names of visual categories. In additional examples, the neural network encoder 304 extracts visual features from digital images by extracting a sequence of patch vectors from a digital image and encoding the patch vectors via one or more transformer layers (e.g., a vision transformer neural network with quadrangle attention).

Additionally, as illustrated in FIG. 3, the cross-modal neural network includes a projection layer 306 to convert the extracted features from a feature space of the neural network encoder 304 to a feature space of a large language machine-learning model 308. In particular, in some embodiments, the neural network encoder 304 generates features in a different dimensionality than the large language machine-learning model 308 operates. Accordingly, the projection layer 306 converts the extracted features from a first dimensionality corresponding to the neural network encoder 304 to a second dimensionality corresponding to the large language machine-learning model 308. In some embodiments, the projection layer 306 includes a linear projection layer comprising a dense layer that outputs a higher-dimensional vector than the input to the projection layer 306.

In one or more embodiments, in response to converting the feature maps extracted from the first digital image 300 and the second digital image 302 to the feature space of the large language machine-learning model 308, the image difference captioning system 102 combines the modified feature maps. Additionally, in some embodiments as illustrated in FIG. 3, the image difference captioning system 102 adds a prefix 310 for generating a difference caption 312 including the prefix 310. For instance, the image difference captioning system 102 extracts features of the prefix 310 to the feature space corresponding to the large language machine-learning model 308 and adds the extracted features to the combined feature maps.

In additional embodiments, as illustrated in FIG. 3, the image difference captioning system 102 utilizes the large language machine-learning model 308 to generate the difference caption 312 for the first digital image 300 and the second digital image 302. In particular, the image difference captioning system 102 utilizes the large language machine-learning model 308 to convert the combined feature maps (and in some cases the features of the prefix 310) to a human-readable text phrase. To illustrate, the difference caption 312 includes one or more sentences or phrases that describe detected differences between the digital images in natural language. For example, the image difference captioning system 102 provides the difference caption 312 for display at a client device with the first digital image 300 and/or the second digital image 302.

In one or more embodiments, the large language machine-learning model 308 includes an artificial neural network with a plurality of neural network layers. For example, the large language machine-learning model 308 includes one or more recurrent neural networks, feedforward layers, transformer layers, decoder layers, attention layers, and/or other neural network layers. Additionally, in some embodiments, the large language machine-learning model 308 includes a pre-trained neural network that converts the features from the feature space of the large language machine-learning model 308 to natural language text. Accordingly, in some embodiments, the image difference captioning system 102 injects the combined feature maps into a decoder portion of the large language machine-learning model 308 (e.g., rather than an encoder portion of the large language machine-learning model 308).

In one or more embodiments, as mentioned, the image difference captioning system 102 generates feature maps from digital images and converts the feature maps to a feature space of a large language machine-learning model. FIG. 4 illustrates that the image difference captioning system 102 generates and modifies feature maps corresponding to digital images. Additionally, FIG. 4 illustrates that the image difference captioning system 102 combines feature maps for digital images with features associated with a prefix for providing to a large language machine-learning model.

According to one or more embodiments, as previously mentioned, the image difference captioning system 102 generates feature maps representing a plurality of digital images. For example, as illustrated in FIG. 4, the image difference captioning system 102 generates a first feature map 400 representing a first digital image and a second feature map 402 representing a second digital image. More specifically, the image difference captioning system 102 utilizes a neural network encoder of a cross-modal neural network to generate the first feature map 400 and the second feature map 402 in a first feature space (e.g., a feature space of an output of the neural network encoder) in a pairwise manner.

Additionally, as illustrated, the image difference captioning system 102 utilizes a linear projection layer 404 of the cross-modal neural network to convert the feature maps to a different feature space. In particular, the image difference captioning system 102 utilizes the linear projection layer 404 to convert the feature maps from a feature space with lower dimensionality to a feature space with higher dimensionality (e.g., corresponding to a large language machine-learning model 414). In one or more embodiments, the linear projection layer 404 includes a trainable neural network layer that the image difference captioning system 102 trains to accurately convert the feature maps from the first feature space to the second feature space. Accordingly, the image difference captioning system 102 utilizes the linear projection layer 404 to generate a first modified feature map 406 from the first feature map 400 and a second modified feature map 408 from the second feature map 402.

In one or more embodiments, the image difference captioning system 102 generates a combined feature map 410 from the modified feature maps. Specifically, the image difference captioning system 102 combines the first modified feature map 406 with the second modified feature map 408 to generate the combined feature map 410. In one or more embodiments, the image difference captioning system 102 concatenates the first modified feature map 406 and the second modified feature map 408. For example, the image difference captioning system 102 generates a concatenated feature map by appending the second modified feature map 408 to the first modified feature map 406, or vice-versa.

In additional embodiments, the image difference captioning system 102 generates the combined feature map 410 based on a difference between the first modified feature map 406 and the second modified feature map 408. In particular, the image difference captioning system 102 generates a difference feature map by determining feature differences between the first modified feature map 406 and the second modified feature map 408. Thus, rather than concatenating the first modified feature map 406 with the second modified feature map 408, the image difference captioning system 102 determines a difference between the modified feature maps in the second feature space, depending on the implementation of the large language machine-learning model 414.

In one or more embodiments, as mentioned, the image difference captioning system 102 also adds a pre-defined prefix to the combined feature map 410. For instance, the image difference captioning system 102 generates a representation of the prefix within the feature space of the large language machine-learning model 414. To illustrate, the image difference captioning system 102 generates a token embedding 412 representing the prefix, such as by utilizing an additional neural network encoder to generate a feature vector or other feature representation of the prefix in the feature space of the large language machine-learning model 414.

Additionally, the image difference captioning system 102 combines the token embedding with the combined feature map 410. For example, the image difference captioning system 102 appends the token embedding 412 to the combined feature map 410 (e.g., to an end of the combined feature map 410 or to a beginning of the combined feature map 410). Thus, the image difference captioning system 102 combines the token embedding 412 with a concatenated feature map or a difference feature map to provide to the large language machine-learning model 414. The image difference captioning system 102 provides the combination of the combined feature map 410 and the token embedding 412 to the large language machine-learning model 414 to generate a difference caption.

According to one or more embodiments, the image difference captioning system 102 utilizes a trainable linear mapping between a neural network encoder for digital images and a large language machine-learning model. Specifically, instead of passing projected embeddings (e.g., modified feature maps) of a single digital image to the large language machine-learning model, the image difference captioning system 102 projects the embeddings of two digital images prior to feeding a combination of the embeddings to the large language machine-learning model. For example, given a source image I and an edited version I' of the source image I, the image difference captioning system 102 uses a neural network encoder $\varepsilon$ to extract feature maps of the digital images as:

$$f = \varepsilon(I); f' = \varepsilon(I') \in \mathbb{R}^{k \times h},$$

where h represents the size of the feature maps and k represents a prompt sequence length. In one or more embodiments, the image difference captioning system 102 uses a fully-connected linear projection layer $\mathcal{P}$ to linearly project the feature maps into a dimensionality of a large language machine-learning model input e, thus creating a soft prompt $s^v$ as:

$$s^v = [\mathcal{P}(f), \mathcal{P}(f')] \in \mathbb{R}^{2k \times e},$$

where [,] denotes a concatenation. Furthermore, the image difference captioning system 102 appends a prefix $s_r$ including an embedding of tokens for a pre-defined prefix (e.g., "The differences between the images are as follows:") to the soft prompt $s^v$ to obtain a final prompt $s=[s^v, s^r]$ for generating a difference caption.

Furthermore, as mentioned above, the image difference captioning system 102 utilizes different neural network encoder architectures for different implementations. For instance, in one or more embodiments, the image difference captioning system 102 utilizes a contrastive learning model trained on natural language to identify visual concepts with natural language output. To illustrate, the image difference captioning system 102 utilizes such a model as the neural network encoder $\varepsilon$, in which the feature map prior to a pooling layer has dimensions 12×12×3072, flattened to k×h=144×3072. In one or more alternative embodiments, the image difference captioning system 102 utilizes a vision transformer neural network with quadrangle attention (e.g., a "Q-Former"). To illustrate, the image difference captioning system 102 utilizes a sequence length of k=257.

Furthermore, in one or more embodiments, the image difference captioning system 102 utilizes a large language machine-learning model with an input space dimensionality of l=4096. Accordingly, for both configurations of the neural network encoder $\varepsilon$, the image difference captioning system

102 utilizes the linear projection layer $\mathcal{P}$ to convert a feature map for each image from input dimensions h=3072 to output dimensions l=4096.

In one or more embodiments, the image difference captioning system 102 also trains one or more components of the cross-modal neural network utilizing generated difference captions. In particular, FIGS. 5-6 illustrate embodiments in which the image difference captioning system 102 utilizes predicted captions for a plurality of digital images to train the cross-modal neural network. In various embodiments, the image difference captioning system 102 trains a linear projection layer of the cross-modal neural network while freezing parameters of a neural network encoder and a large language machine-learning model in the cross-modal neural network.

As illustrated in FIG. 5, the image difference captioning system 102 identifies a plurality of digital images in an image pair. For instance, the image difference captioning system 102 identifies a first digital image 500 and a second digital image 502 that is a modified version of the first digital image 500. Additionally, as illustrated, the image difference captioning system 102 utilizes a cross-modal neural network 504 including a trainable linear projection layer to generate a predicted caption 506. More specifically, the predicted caption 506 includes a difference caption indicating one or more differences detected between the first digital image 500 and the second digital image 502.

In connection with generating the predicted caption 506 for the image pair, the image difference captioning system 102 also determines annotations associated with the image pair. Specifically, as illustrated in FIG. 5, the image difference captioning system 102 determines image descriptions 508 corresponding to the first digital image 500 and the second digital image 502. For example, the image difference captioning system 102 generates annotations for the image pair including text descriptions of the first digital image 500 and the second digital image 502 (e.g., via crowd-sourcing, object detection, or other image processes). To illustrate, the image difference captioning system 102 generates a first text description (e.g., "a wallpaper image of dogs") and a second text description (e.g., "a wallpaper image of cats"). Furthermore, in some embodiments, the image descriptions 508 include a text description of an edit made to the first digital image 500 to obtain the second digital image 502, such that the image difference captioning system 102 generates a third text description (e.g., "replace with cats").

In response to generating or otherwise determining the image descriptions 508, the image difference captioning system 102 provides the image descriptions 508 to a large language machine-learning model 510. For instance, the large language machine-learning model 510 includes the same, a similar, or a different large language machine-learning model as used in the cross-modal neural network 504. In particular, the image difference captioning system 102 utilizes the large language machine-learning model 510 to generate a target caption 512. To illustrate, the image difference captioning system 102 utilizes the large language machine-learning model 510 to generate the target caption 512 based on the text descriptions of the first digital image 500 and the second digital image 502. The target caption 512 thus includes a text-based description of a difference between text descriptions of digital images.

In one or more embodiments, the image difference captioning system 102 determines a loss 514 based on the predicted caption 506 and the target caption 512. For example, the image difference captioning system 102 compares the predicted caption 506 to the target caption 512 by comparing feature representations corresponding to the predicted caption 506 and the target caption 512. To illustrate, the image difference captioning system 102 determines the feature representations of the corresponding captions by accessing the feature maps from the cross-modal neural network 504 and/or the large language machine-learning model 510 (e.g., in the feature space of the corresponding large language machine-learning models). Alternatively, the image difference captioning system 102 determines the loss 514 by directly comparing the predicted caption 506 and the target caption 512 (e.g., utilizing a large language machine-learning model to compare phrases and/or another neural network). The image difference captioning system 102 utilizes the loss 514 to train (e.g., learn parameters of) the linear projection layer of the cross-modal neural network 504 to ensure that the linear projection layer accurately converts feature maps to a feature space of the large language machine-learning model of the cross-modal neural network 504.

FIG. 6 illustrates an embodiment in which the image difference captioning system 102 utilizes an image pair including distractor images to train a cross-modal neural network. Specifically, the image difference captioning system 102 determines a first digital image 600 and a second digital image 602 that are copies of the same image. For example, the second digital image 602 includes a copy of the first digital image 600 (e.g., I=I'). Accordingly, the first digital image 600 and the second digital image 602 have no differences. In one or more embodiments, the image difference captioning system 102 utilizes a cross-modal neural network 604 to generate a predicted caption 606.

Furthermore, in one or more embodiments, the image difference captioning system 102 determines a ground-truth for the predicted caption 606 from a set of pre-defined captions 608. In particular, the image difference captioning system 102 randomly selects a target caption 610 from the pre-defined captions 608. As an example, the pre-defined captions 608 include a plurality of phrases or sentences synonymous with "There is no difference between the images." The image difference captioning system 102 thus chooses the target caption 610 from the pre-defined captions 608 indicating that there is no difference between the first digital image 600 and the second digital image 602.

Furthermore, the image difference captioning system 102 determines a loss 612 based on (or otherwise corresponding to) the predicted caption 606 and the target caption 610. To illustrate, as mentioned previously, the image difference captioning system 102 determines the loss 612 by comparing a feature map used to generate the predicted caption 606 and a feature representation of the target caption 610. For example, the image difference captioning system 102 utilizes a large language machine-learning model or other neural network to convert the target caption 610 and/or the predicted caption 606 to the feature space of the large language machine-learning model of the cross-modal neural network 604. The image difference captioning system 102 determines the loss 612 and utilizes the loss 612 to update parameters of the linear projection layer of the cross-modal neural network 604.

In one or more embodiments, the image difference captioning system 102 determines a loss as:

$$\mathcal{L} = -\sum_{i=1}^{m} l(s^v, s_1^t, \dots, s_i^t),$$

where m represents a variable token length and l represents a next-token log-probability conditioned on the previous sequence elements. In particular, l is represented as:

$$l(s^v, s_1^c, \ldots, s_i^t) = \log p(t_i | x, t_1, \ldots, t_{i-1}).$$

In at least some embodiments, the image difference captioning system 102 provides distractor image pairs, as in FIG. 6, with no changes present by providing the same image as both inputs to the cross-modal neural network. For example, the image difference captioning system 102 determines the frequency of distractor images by a probability $\rho_d$. In such cases, the image difference captioning system 102 determines the target caption at random from a list of pre-defined sentences. In one or more embodiments, the image difference captioning system 102 trains the cross-modal neural network with $\rho_d = 0$ for a number of epochs (e.g., two epochs), followed by an additional number of epochs (e.g., two epochs) with $\rho_d = 0.5$. Furthermore, in some embodiments, the image difference captioning system 102 uses gradient accumulation to train on a batch of image pairs and optimizing the loss using a stochastic gradient descent optimization method or an adaptive optimizer with $\beta_1 = 0.9$, $\beta_2 = 0.98$, and weight decay of 0.05. In alternative embodiments, the image difference captioning system 102 utilizes other parameters (e.g., different values of $\beta_1$, $\beta_2$, and or weight decay) and/or other optimizers.

Figure 7A:
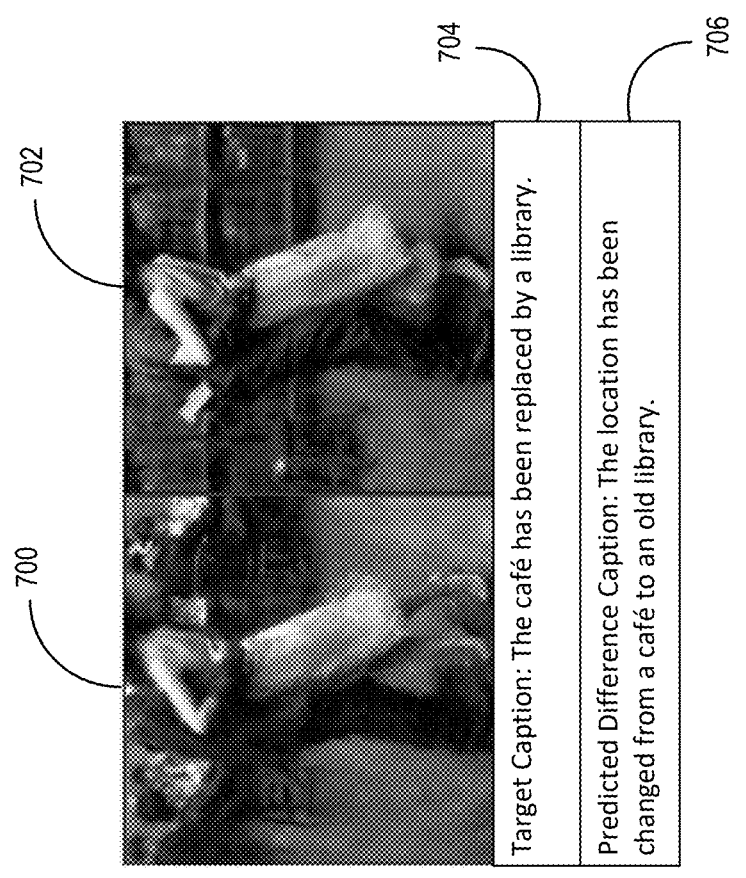
FIGS. 7A-7C illustrate digital image pairs with target captions and generated captions corresponding to detected differences in the digital image pairs in accordance with one or more implementations.
Figure 7B:
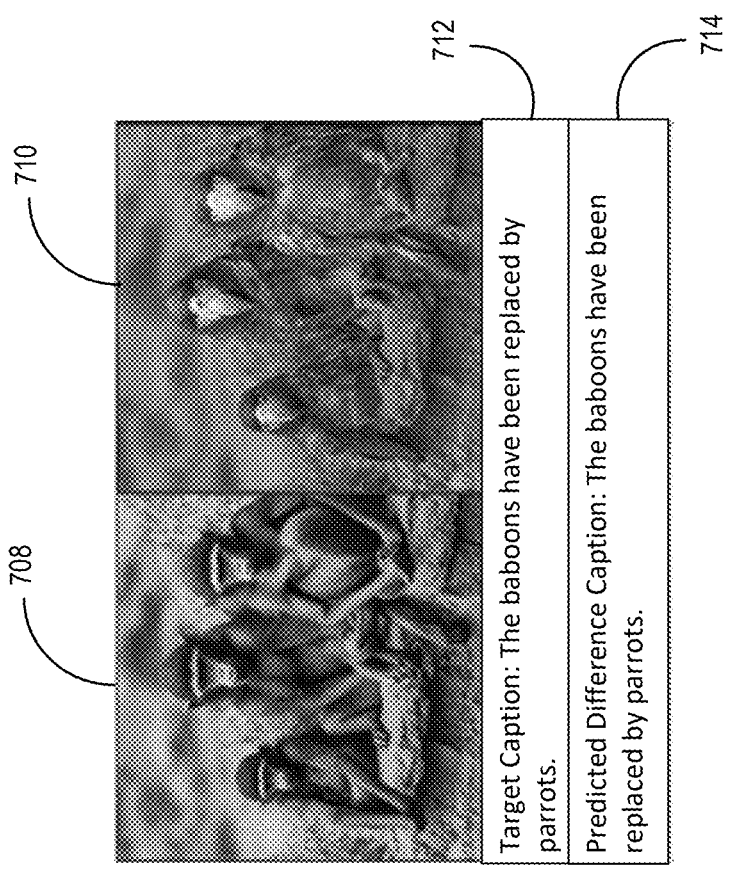
Figure 7C:
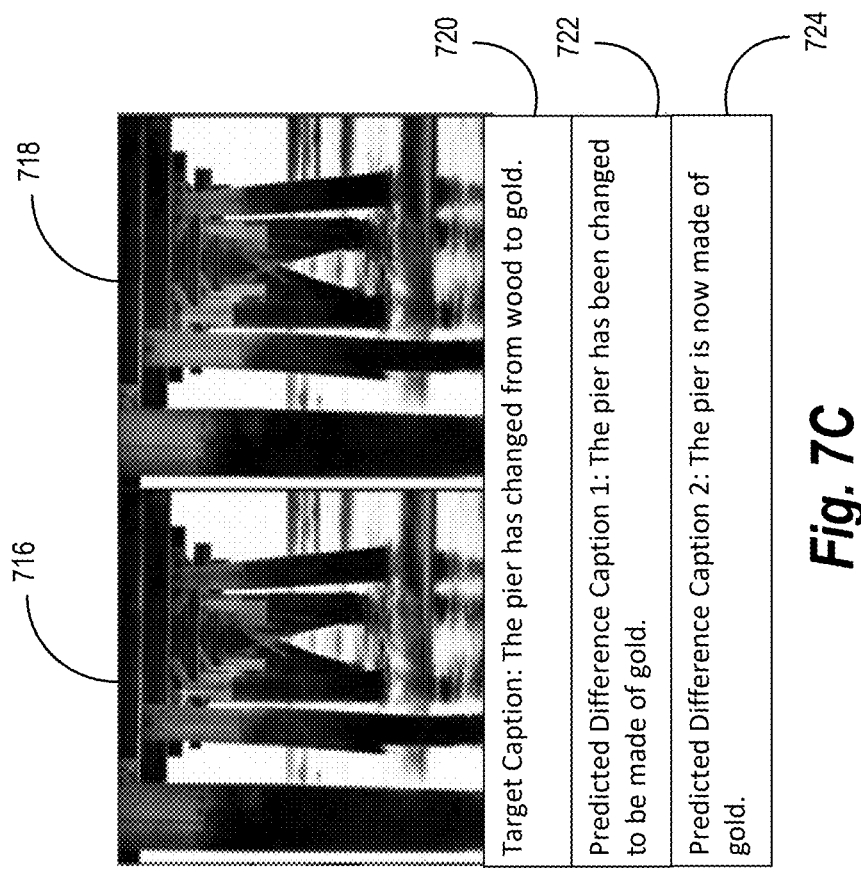

Furthermore, in experimental results corresponding to one or more embodiments of the image difference captioning system 102, the image difference captioning system 102 generates difference captions for image pairs as compared to target captions. FIGS. 7A-7C illustrate image pairs of digital images and synthetically modified versions of the digital images. Additionally, FIGS. 7A-7C illustrate target captions for the image pairs and one or more predicted difference captions generated by one or more versions of a cross-modal neural network.

Specifically, as illustrated in FIG. 7A, an image pair includes a first digital image 700 and a second digital image. As shown, the second digital image 702 includes a synthetically modified version of the first digital image 700. Additionally, a target caption 704 includes a ground-truth description of changes made to the first digital image 700 to obtain the second digital image 702 (e.g.. a change to a background of the first digital image 700). FIG. 7A illustrates a predicted difference caption 706 that the image difference captioning system 102 generates utilizing a transformer-based neural network encoder in a cross-modal neural network. As illustrated, the predicted difference caption 706 accurately describes the background change made to the first digital image 700 to obtain the second digital image 702 with minor variances in the natural language description.

FIG. 7B illustrates an additional image pair including a first digital image 708 and a second digital image 710. In particular, the second digital image 710 includes a synthetically modified version of the first digital image 708 in which a subject replacement has occurred (i.e., baboons are replaced with parrots). The image difference captioning system 102 determines a target caption 712 describing the subject replacement in the first digital image 708 to obtain the second digital image 710. Furthermore, FIG. 7B illustrates a predicted difference caption 714 generated by a contrastive learning neural network encoder in a cross-modal neural network. As illustrated, the image difference captioning system 102 generates the predicted difference caption 714 that exactly matches the target caption 712.

FIG. 7C illustrates an image pair including a first digital image 716 and a second digital image 718 with a material change between the first digital image 716 and the second digital image 718 (i.e., a material of the pier is changed from wood to gold). The image difference captioning system 102 determines a target caption 720 describing the material replacement in the first digital image 716 to obtain the second digital image 718. Furthermore, FIG. 7C illustrates a first predicted difference caption 722 generated by a transformer-based neural network encoder in a cross-modal neural network and a second predicted difference caption 724 generated by a contrastive learning neural network encoder in a cross-modal neural network. As illustrated, the image difference captioning system 102 generates the first predicted difference caption 722 and the second predicted difference caption 724 that closely align with the target caption 720. Accordingly, as illustrated in FIGS. 7A-7C, the image difference captioning system 102 provides a plurality of configurations of a neural network encoder to detect changes to backgrounds, subjects, and/or materials and accurately represent the changes in predicted difference captions.

In one or more additional embodiments, the image difference captioning system 102 generates predicted captions for image datasets in comparison to a plurality of conventional systems. For example, as provided in the table below, experimental data for difference captions generated by a transformer-based version of the image difference captioning system 102 ("System 1") and a contrastive learning version of the image difference captioning system 102 ("System 2") indicates improved performance over difference captions generated by various conventional systems ("CLIP4IDC" and "IDC"). In particular, the table includes performance indicators using N-gram-based metrics (BLEU-4 ("B@4"), CIDEr ("C"), METEOR ("M"), ROUGE-L ("R")) and a semantic similarity metric based on a language transformer model (MPNet). Additionally, the table includes performance for subsets at an image-caption correspondence threshold of 4.

For a large diversity of images and edits, generated difference captions should encompass a larger vocabulary to accurately describe the changes. Thus, while captions may not align word-for-word with the ground-truth captions, the difference captions generated by the image difference captioning system 102 convey a similar or closely related meaning. To account for such cases, the image difference captioning system 102 uses a semantic textual similarity metric defined as $S_{sim} = \cos(E(c), E(c'))$, where $$\cos(,) = \frac{A \cdot B}{\|A\|\|B\|}$$

represents a cosine similarity, and E represents a sentence transformer. As shown in Table 1, the image difference captioning system 102 outperforms, or is similar to, the conventional systems in most metrics for each dataset.

| Method | MPNet | B@4 | C | M | R |
|--------|-------|-----|-----|------|------|
| | | Dataset 1 | | | |
| System 1 | 59.1 | 18.6 | 93.9 | 18.4 | 40.1 |
| System 2 | 61.4 | 18.2 | 107.0 | 18.6 | 40.8 |
| CLIP4IDC | 58.3 | 17.3 | 71.0 | 22.5 | 35.1 |
| IDC | 38.6 | 8.8 | 5.0 | 16.8 | 30.0 |
| | | Dataset 2 | | | |
| System 1 | 45.1 | 5.8 | 7.5 | 11.0 | 22.2 |
| System 2 | 40.3 | 4.5 | 7.7 | 9.5 | 20.5 |
| CLIP4IDC | 32.7 | 3.2 | 5.0 | 10.1 | 21.7 |
| IDC | 27.0 | 1.0 | 0.7 | 9.2 | 19.5 |

Figure 8:
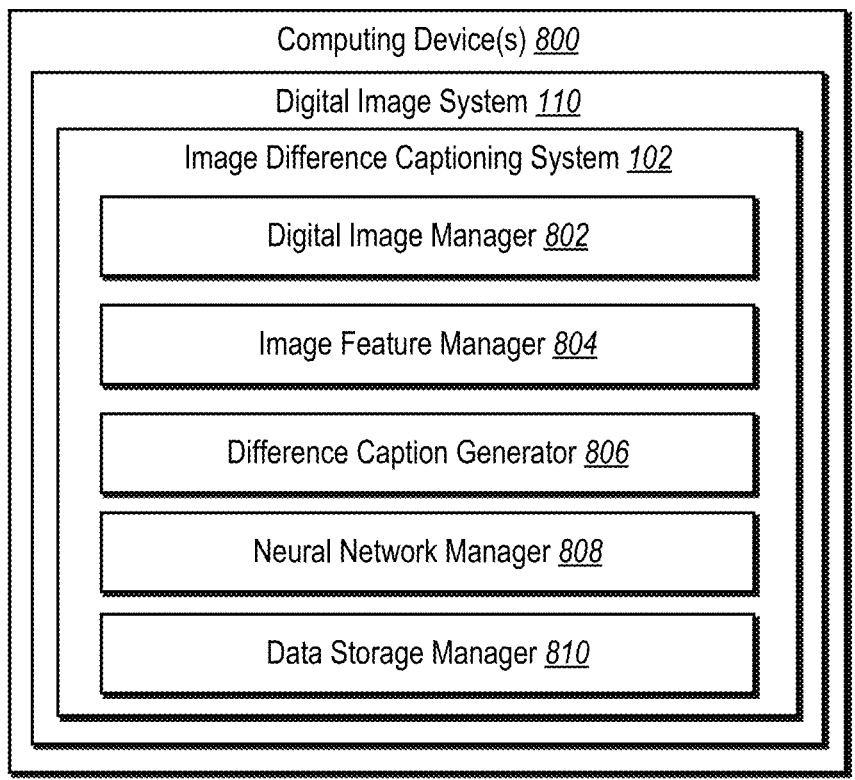
FIG. 8 illustrates a diagram of the image difference captioning system of FIG. 1 in accordance with one or more implementations.

FIG. 8 illustrates a detailed schematic diagram of an embodiment of the image difference captioning system 102 described above. As shown, the image difference captioning system 102 is implemented in an digital image system 110 on computing device(s) 800 (e.g., a client device and/or server device as described in FIG. 1, and as further described below in relation to FIG. 10). Additionally, the image difference captioning system 102 includes, but is not limited to, a digital image manager 802, an image feature manager 804, a difference caption generator 806, a neural network manager 808, and a data storage manager 810. In one or more embodiments, the image difference captioning system 102 is implemented on any number of computing devices. For example, the image difference captioning system 102 can be implemented in a distributed system of server devices for digital images. The image difference captioning system 102 can also be implemented within one or more additional systems. Alternatively, the image difference captioning system 102 can be implemented on a single computing device such as a single client device.

In one or more embodiments, each of the components of the image difference captioning system 102 is in communication with other components using any suitable communication technologies. Additionally, the components of the image difference captioning system 102 are capable of being in communication with one or more other devices including other computing devices of a user, server devices (e.g., cloud storage devices), licensing servers, or other devices/systems. It will be recognized that although the components of the image difference captioning system 102 are shown to be separate in FIG. 8, any of the subcomponents may be combined into fewer components, such as into a single component, or divided into more components as may serve a particular implementation. Furthermore, although the components of FIG. 8 are described in connection with the image difference captioning system 102, at least some of the components for performing operations in conjunction with the image difference captioning system 102 described herein may be implemented on other devices within the environment.

In some embodiments, the components of the image difference captioning system 102 include software, hardware, or both. For example, the components of the image difference captioning system 102 include one or more instructions stored on a computer-readable storage medium and executable by processors of one or more computing devices (e.g., the computing device(s) 800). When executed by the one or more processors, the computer-executable instructions of the image difference captioning system 102 cause the computing device(s) 800 to perform the operations described herein. Alternatively, the components of the image difference captioning system 102 include hardware, such as a special purpose processing device to perform a certain function or group of functions. Additionally, or alternatively, the components of the image difference captioning system 102 include a combination of computer-executable instructions and hardware.

Furthermore, the components of the image difference captioning system 102 performing the functions described herein with respect to the image difference captioning system 102 may, for example, be implemented as part of a stand-alone application, as a module of an application, as a plug-in for applications, as a library function or functions that may be called by other applications, and/or as a cloud-computing model. Thus, the components of the image difference captioning system 102 may be implemented as part of a stand-alone application on a personal computing device or a mobile device. Alternatively, or additionally, the components of the image difference captioning system 102 may be implemented in any application that provides digital image difference captioning, including, but not limited to ADOBE® PHOTOSHOP®, ADOBE® LIGHTROOM®, and ADOBE® CREATIVE CLOUD® software.

As illustrated, the image difference captioning system 102 includes a digital image manager 802 to manage digital images. In particular, the digital image manager 802 generates or otherwise obtains digital images. For example, the digital image manager 802 determines digital image pairs, such as in response to a request to determine whether a digital image is a modified version of another digital image. The digital image manager 802 accesses one or more digital image databases and/or receives digital image inputs to determine image pairs.

The image difference captioning system 102 includes an image feature manager 804 to extract image features from digital images. For instance, the image feature manager 804 utilizes a neural network (e.g., by communicating with the neural network manager 808) to generate feature maps for digital images in an image pair in a pairwise manner. Also, the image feature manager 804 utilizes a neural network to convert the feature maps from a first feature space to a second feature space.

The image difference captioning system 102 also includes a difference caption generator 806 to generate difference captions for an image pair. In particular, the difference caption generator 806 utilizes feature maps generated by the image feature manager 804 (e.g., via a large language machine-learning model) to generate a difference caption indicating a difference between digital images in an image pair. Furthermore, in some embodiments, the difference caption generator 806 generates a difference caption with a pre-defined prefix, such as by generating a token embedding of the prefix and combining the token embedding with the feature maps.

The image difference captioning system 102 further includes a neural network manager 808 to manage storage and training of one or more neural networks. For example, the neural network manager 808 trains a linear projection layer of a cross-modal neural network. The neural network manager 808 also communicates with one or more other components to obtain data for training the cross-modal neural network and/or for providing data to the one or more other components in connection with generating difference captions.

The image difference captioning system 102 also includes a data storage manager 810 (that comprises a non-transitory computer memory) that stores and maintains data associated with generating difference captions for digital images. For example, the data storage manager 810 stores digital images, feature maps representing the digital images, prefixes, token embeddings of prefixes, and generated difference captions. The data storage manager 810 also stores data for training a neural network, including one or more neural networks (e.g., a cross-modal neural network, a large language machine-learning model) and target captions for use in determining losses for training the neural network(s).

Turning now to FIG. 9, this figure shows a flowchart of a series of acts 900 of generating difference captions for digital images in image pairs using a cross-modal neural network. While FIG. 9 illustrates acts according to one embodiment, alternative embodiments may omit, add to, reorder, and/or modify any of the acts shown in FIG. 9. The acts of FIG. 9 are part of a method. Alternatively, a non-transitory computer readable medium comprises instructions, that when executed by one or more processors, cause the one or more processors to perform the acts of FIG. 9. In still further embodiments, a system includes a processor or server configured to perform the acts of FIG. 9.

As shown, the series of acts 900 includes an act 902 of generating feature maps of digital images. In particular, act 902 includes an act 904 of generating a first feature map of a first digital image and an act 906 of generating a second feature map of a second digital image. The series of acts 900 also includes an act 908 of converting the feature maps to a model feature space. Specifically, act 908 includes an act 910 of converting the first feature map to a first modified feature map and an act 912 of converting the second feature map to a second modified feature map. Additionally, the series of acts 900 includes an act 914 of generating a difference caption from the modified feature maps utilizing a large language machine-learning model.

In one or more embodiments, act 902 involves generating, utilizing a neural network encoder, a first feature map of a first digital image and a second feature map of a second digital image. In one or more embodiments, act 904 involves converting, utilizing a linear projection neural network layer, the first feature map to a first modified feature map in a feature space corresponding to a large language machine-learning model. Act 906 involves converting, utilizing the linear projection neural network layer, the second feature map to a second modified feature map in the feature space corresponding to the large language machine-learning model. Act 908 involves generating, utilizing the large language machine-learning model, a difference caption indicating a difference between the first digital image and the second digital image from a combination of the first modified feature map and the second modified feature map.

In one or more embodiments, the series of acts 900 includes determining that the second digital image corresponds to the first digital image based on metadata or a digital fingerprint associated with the second digital image. Additionally, the series of acts 900 includes generating the first feature map of the first digital image and the second feature map of the second digital image in response to determining that the second digital image corresponds to the first digital image.

In one or more embodiments, the series of acts 900 includes converting the first feature map to the first modified feature map comprises converting the first feature map from an initial feature space of the neural network encoder comprising a first dimensionality to the feature space corresponding to the large language machine-learning model comprising a second dimensionality, The series of acts 900 further includes converting the second feature map to the second modified feature map comprises converting the second feature map from the initial feature space of the neural network encoder comprising the first dimensionality to the feature space corresponding to the large language machine-learning model comprising the second dimensionality.

According to one or more embodiments, the series of acts 900 includes generating a concatenated feature map by concatenating the first modified feature map and the second modified feature map in the feature space corresponding to the large language machine-learning model. The series of acts 900 further includes generating, utilizing the large language machine-learning model, the difference caption from the concatenated feature map.

In some embodiments, the series of acts 900 includes generating a difference feature map by determining a feature difference between the first modified feature map and the second modified feature map in the feature space corresponding to the large language machine-learning model. The series of acts 900 also includes generating, utilizing the large language machine-learning model, the difference caption from the difference feature map.

In one or more embodiments, the series of acts 900 includes generating, within the feature space corresponding to the large language machine-learning model, a token embedding corresponding to a prefix prompt. The series of acts 900 also includes generating the difference caption comprising the prefix prompt by combining the token embedding with the first modified feature map and the second modified feature map.

In one or more embodiments, the series of acts 900 includes generating a target caption based on an image editing task for an image pair comprising the first digital image and the second digital image. For example, the series of acts 900 includes determining a first description of the first digital image, a second description of the second digital image, and an image editing task description corresponding to an image editing task associated with the image pair. The series of acts 900 also includes generating, utilizing a neural network, the target caption based on the first description, the second description, and the image editing task description. Additionally, the series of acts 900 includes learning parameters of the linear projection neural network layer based on a loss determined between the difference caption and the target caption.

According to one or more embodiments, the series of acts 900 includes determining the first digital image and the second digital image from a distractor image pair comprising copies of a single digital image. The series of acts 900 further includes selecting a target caption from a set of pre-defined captions indicating no difference between the first digital image and the second digital image. The series of acts 900 also includes learning parameters of the linear projection neural network layer based on a loss determined between the difference caption and the target caption.

In one or more embodiments, the series of acts 900 includes generating, utilizing a neural network encoder, separate feature maps of the plurality of digital images. The series of acts 900 further includes converting, utilizing a linear projection neural network layer, the separate feature maps of the plurality of digital images to separate modified feature maps in a feature space corresponding to a large language machine-learning model. Additionally, the series of acts 900 includes generating a combined feature map in the feature space corresponding to the large language machine-learning model by combining the separate modified feature maps. The series of acts 900 also includes generating, utilizing the large language machine-learning model, a difference caption comprising text indicating a difference between at least two digital images of the plurality of digital images from the combined feature map.

In one or more embodiments, the series of acts 900 includes generating the separate feature maps of the plurality of digital images by generating a first set of feature maps for an image pair of the plurality of digital images, the image pair comprising a digital image and a modified version of the digital image. Alternatively, the series of acts 900 includes generating the separate feature maps of the plurality of digital images by generating a first set of feature maps for an image pair of the plurality of digital images, the image pair comprising identical versions of a digital image.

In some embodiments, the series of acts 900 includes converting a first feature map of a first digital image of the plurality of digital images to a first modified feature map in the feature space corresponding to the large language machine-learning model, the feature space corresponding to the large language machine-learning model comprising a different dimensionality of an additional feature space corresponding to the neural network encoder. Additionally, the series of acts 900 includes converting a second feature map of a second digital image of the plurality of digital images to a second modified feature map in the feature space corresponding to the large language machine-learning model.

In one or more embodiments, the series of acts 900 includes generating the combined feature map by generating a concatenated feature map from the separate modified feature maps. Alternatively, the series of acts 900 includes generating the combined feature map by determining a difference feature map from the separate modified feature maps.

In one or more embodiments, the series of acts 900 includes generating the difference caption by generating, within the feature space corresponding to the large language machine-learning model, a token embedding corresponding to a prefix prompt. Additionally, the series of acts 900 includes generating, utilizing the large language machine-learning model, the difference caption comprising the prefix prompt by combining the token embedding with the separate modified feature maps.

In one or more embodiments, the series of acts 900 includes determining a target caption for the plurality of digital images based on text descriptions of the plurality of digital images and an image editing task description corresponding to one or more image editing tasks associated with the plurality of digital images. The series of acts 900 further includes learning parameters of the linear projection neural network layer based on a loss determined between the difference caption and the target caption.

In one or more embodiments, the series of acts 900 includes generating, utilizing a neural network encoder, a first feature map of a first digital image and a second feature map of a second digital image. The series of acts 900 further includes converting, utilizing a linear projection neural network layer trained on a dataset comprising image pairs with corresponding image edits and target captions, the first feature map to a first modified feature map in a feature space corresponding to a large language machine-learning model. Additionally, the series of acts 900 includes converting, utilizing the linear projection neural network layer, the second feature map to a second modified feature map in the feature space corresponding to the large language machine-learning model. The series of acts 900 also includes generating, utilizing the large language machine-learning model, a difference caption indicating a difference between the first digital image and the second digital image from a combination of the first modified feature map and the second modified feature map.

In one or more embodiments, the series of acts 900 includes determining the combination of the first modified feature map and the second modified feature map by generating a concatenated feature map by concatenating the first modified feature map and the second modified feature map. Alternatively, the series of acts 900 includes determining the combination of the first modified feature map and the second modified feature map by generating a difference feature map by determining a feature difference between the first modified feature map and the second modified feature map. Additionally, the series of acts 900 includes generating, utilizing the large language machine-learning model, the difference caption from the concatenated feature map or the difference feature map.

Additionally, in some embodiments, the series of acts 900 includes generating a token embedding corresponding to a prefix prompt. The series of acts 900 includes combining the prefix prompt with the first modified feature map and the second modified feature map. Furthermore, the series of acts 900 includes generating the difference caption from the prefix prompt, the first modified feature map, and the second modified feature map.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
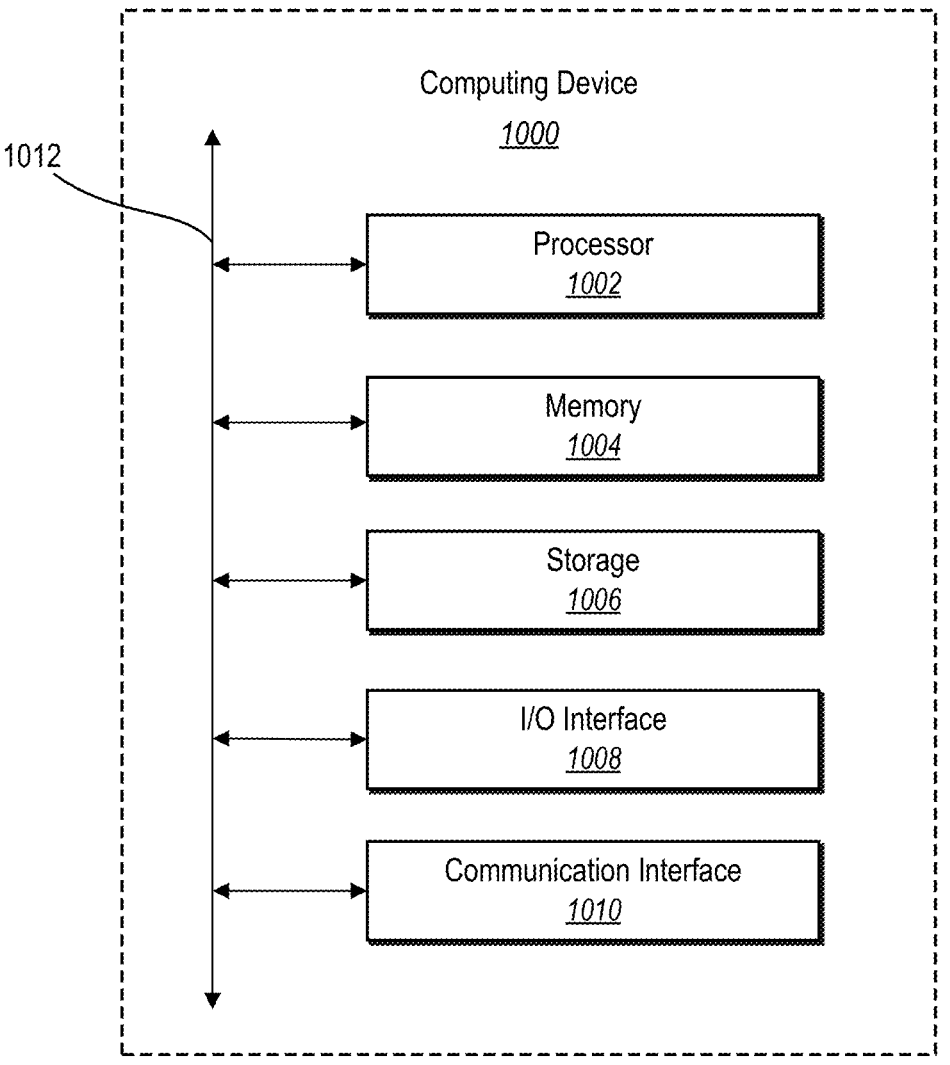
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   generating, utilizing a neural network encoder, a first feature map of a first digital image and a second feature map of a second digital image;
   converting, utilizing a linear projection neural network layer, the first feature map to a first modified feature map in a feature space corresponding to a large language machine-learning model;
   converting, utilizing the linear projection neural network layer, the second feature map to a second modified feature map in the feature space corresponding to the large language machine- learning model; and
   generating, utilizing the large language machine-learning model, a difference caption indicating a difference between the first digital image and the second digital image from a difference feature map determined from the first modified feature map and the second modified feature map.

2. The computer-implemented method of claim 1, further comprising:
   determining that the second digital image corresponds to the first digital image based on metadata or a digital fingerprint associated with the second digital image; and generating the first feature map of the first digital image and the second feature map of the second digital image in response to determining that the second digital image corresponds to the first digital image.

3. The computer-implemented method of claim 1, wherein:
   converting the first feature map to the first modified feature map comprises converting the first feature map from an initial feature space of the neural network encoder comprising a first dimensionality to the feature space corresponding to the large language machine-learning model comprising a second dimensionality; and
   converting the second feature map to the second modified feature map comprises converting the second feature map from the initial feature space of the neural network encoder comprising the first dimensionality to the feature space corresponding to the large language machine-learning model comprising the second dimensionality.

4. The computer-implemented method of claim 1, wherein generating the difference caption comprises:
   generating a concatenated feature map by concatenating the first modified feature map and the second modified feature map in the feature space corresponding to the large language machine-learning model; and
   generating, utilizing the large language machine-learning model, the difference caption from the concatenated feature map.

5. The computer-implemented method of claim 1, wherein generating the difference caption comprises:
   generating the difference feature map by determining a feature difference between the first modified feature map and the second modified feature map in the feature space corresponding to the large language machine-learning model; and
   generating, utilizing the large language machine-learning model, the difference caption from the difference feature map.

6. The computer-implemented method of claim 1, wherein generating the difference caption comprises:
   generating, within the feature space corresponding to the large language machine-learning model, a token embedding corresponding to a prefix prompt; and
   generating the difference caption comprising the prefix prompt by combining the token embedding with the first modified feature map and the second modified feature map.

7. The computer-implemented method of claim 1, further comprising:
   generating a target caption based on an image editing task for an image pair comprising the first digital image and the second digital image; and
   learning parameters of the linear projection neural network layer based on a loss determined between the difference caption and the target caption.

8. The computer-implemented method of claim 7, wherein generating the target caption comprises:
   determining a first description of the first digital image, a second description of the second digital image, and an image editing task description corresponding to an image editing task associated with the image pair; and
   generating, utilizing a neural network, the target caption based on the first description, the second description, and the image editing task description.

9. The computer-implemented method of claim 1, further comprising:

determining the first digital image and the second digital image from a distractor image pair comprising copies of a single digital image;

selecting a target caption from a set of pre-defined captions indicating no difference between the first digital image and the second digital image; and learning parameters of the linear projection neural network layer based on a loss determined between the difference caption and the target caption.

10. A system comprising:

one or more memory devices comprising a plurality of digital images; and one or more processors configured to cause the system to:

generate, utilizing a neural network encoder, separate feature maps of the plurality of digital images;

convert, utilizing a linear projection neural network layer, the separate feature maps of the plurality of digital images to separate modified feature maps in a feature space corresponding to a large language machine-learning model;

generate a combined feature map in the feature space corresponding to the large language machine-learning model from a difference feature map generated from the separate modified feature maps; and generate, utilizing the large language machine-learning model, a difference caption comprising text indicating a difference between at least two digital images of the plurality of digital images from the combined feature map.

11. The system of claim 10, wherein the one or more processors are configured to cause the system to generate the separate feature maps of the plurality of digital images by generating a first set of feature maps for an image pair of the plurality of digital images, the image pair comprising a digital image and a modified version of the digital image.

12. The system of claim 10, wherein the one or more processors are configured to cause the system to generate the separate feature maps of the plurality of digital images by generating a first set of feature maps for an image pair of the plurality of digital images, the image pair comprising identical versions of a digital image.

13. The system of claim 10, wherein the one or more processors are configured to cause the system to convert the separate feature maps to the separate modified feature maps by:

converting a first feature map of a first digital image of the plurality of digital images to a first modified feature map in the feature space corresponding to the large language machine-learning model, the feature space corresponding to the large language machine-learning model comprising a different dimensionality of an additional feature space corresponding to the neural network encoder; and converting a second feature map of a second digital image of the plurality of digital images to a second modified feature map in the feature space corresponding to the large language machine-learning model.

14. The system of claim 10, wherein the one or more processors are configured to cause the system to generate the combined feature map by generating a concatenated feature map from the separate modified feature maps.

15. The system of claim 10, wherein the one or more processors are configured to cause the system to generate the difference feature map by determining feature differences between the separate feature maps.

16. The system of claim 10, wherein the one or more processors are configured to cause the system to generate the difference caption by:

generating, within the feature space corresponding to the large language machine-learning model, a token embedding corresponding to a prefix prompt; and generating, utilizing the large language machine-learning model, the difference caption comprising the prefix prompt by combining the token embedding with the separate modified feature maps.

17. The system of claim 10, wherein the one or more processors are configured to cause the system to:

determine a target caption for the plurality of digital images based on text descriptions of the plurality of digital images and an image editing task description corresponding to one or more image editing tasks associated with the plurality of digital images; and learn parameters of the linear projection neural network layer based on a loss determined between the difference caption and the target caption.

18. A non-transitory computer readable medium storing executable instructions which, when executed by a processing device, cause the processing device to perform operations comprising:

generating, utilizing a neural network encoder, a first feature map of a first digital image and a second feature map of a second digital image;

converting, utilizing a linear projection neural network layer trained on a dataset comprising image pairs with corresponding image edits and target captions, the first feature map to a first modified feature map in a feature space corresponding to a large language machine-learning model;

converting, utilizing the linear projection neural network layer, the second feature map to a second modified feature map in the feature space corresponding to the large language machine-learning model; and generating, utilizing the large language machine-learning model, a difference caption indicating a difference between the first digital image and the second digital image from a combination of the first modified feature map and the second modified feature map.

19. The non-transitory computer readable medium of claim 18, wherein generating the difference caption comprises:

determining the combination of the first modified feature map and the second modified feature map by:

generating a concatenated feature map by concatenating the first modified feature map and the second modified feature map; or generating a difference feature map by determining a feature difference between the first modified feature map and the second modified feature map; and generating, utilizing the large language machine-learning model, the difference caption from the concatenated feature map or the difference feature map.

20. The non-transitory computer readable medium of claim 18, wherein generating the difference caption comprises:

generating a token embedding corresponding to a prefix prompt;

combining the prefix prompt with the first modified feature map and the second modified feature map; and generating the difference caption from the prefix prompt, the first modified feature map, and the second modified feature map.

* * * * *